United States Patent
Tanaka et al.

(10) Patent No.: US 8,886,041 B2
(45) Date of Patent: Nov. 11, 2014

(54) OPTICAL LINE TERMINAL, BANDWIDTH CONTROL METHOD AND OPTICAL NETWORK SYSTEM

(75) Inventors: Takahiro Tanaka, Yokohama (JP); Tohru Kazawa, Kokubunji (JP); Shota Takagi, Ebina (JP)

(73) Assignee: Hitachi, Ltd., Tokyo (JP)

( * ) Notice: Subject to any disclaimer, the term of this patent is extended or adjusted under 35 U.S.C. 154(b) by 130 days.

(21) Appl. No.: 13/479,825

(22) Filed: May 24, 2012

(65) Prior Publication Data

US 2012/0308228 A1    Dec. 6, 2012

(30) Foreign Application Priority Data

May 30, 2011  (JP) ................................ 2011-120354

(51) Int. Cl.
  *H04B 10/20* (2006.01)
  *H04J 14/08* (2006.01)
  *H04J 14/00* (2006.01)
  *H04L 12/413* (2006.01)
  *H04Q 11/00* (2006.01)

(52) U.S. Cl.
  CPC ...... *H04L 12/413* (2013.01); *H04Q 2011/0064* (2013.01); *H04Q 11/0067* (2013.01)
  USPC ................... 398/58; 398/98; 398/66

(58) Field of Classification Search
  None
  See application file for complete search history.

(56) References Cited

U.S. PATENT DOCUMENTS

| 6,584,330 | B1 * | 6/2003 | Ruuska | 455/574 |
| 8,275,261 | B2 * | 9/2012 | Mandin et al. | 398/72 |
| 8,326,152 | B2 * | 12/2012 | Van Veen et al. | 398/72 |
| 8,498,534 | B2 * | 7/2013 | Hirth et al. | 398/25 |
| 2004/0095884 | A1 * | 5/2004 | Lee et al. | 370/235 |
| 2009/0263127 | A1 * | 10/2009 | Haran et al. | 398/38 |
| 2011/0211837 | A1 * | 9/2011 | Sugawa et al. | 398/67 |
| 2012/0093509 | A1 * | 4/2012 | Kazawa et al. | 398/58 |

FOREIGN PATENT DOCUMENTS

| JP | 2007-019818 A | 1/2007 |
| JP | 2010-114830 A | 5/2010 |

* cited by examiner

*Primary Examiner* — Ken Vanderpuye
*Assistant Examiner* — Jai Lee
(74) *Attorney, Agent, or Firm* — Mattingly & Malur, PC

(57) ABSTRACT

An example is a bandwidth control method employed in an optical line terminal including: determining a first time point at which a first optical network unit starts the processing of transitioning between the states in a case where the first optical network unit is to be transitioned between the states; transmitting a state control signal containing the first time point to the first optical network unit in order to control the first optical network unit to start the processing of transitioning between the states; and stopping allocating a bandwidth used to transmit a signal to the optical line terminal to a second optical network unit during a period from the first time point until it is determined that the first optical network unit has finished the processing of transitioning between the states.

13 Claims, 18 Drawing Sheets

US 8,886,041 B2

OPTICAL LINE TERMINAL, BANDWIDTH CONTROL METHOD AND OPTICAL NETWORK SYSTEM

CLAIM OF PRIORITY

The present application claims priority from Japanese patent application JP 2011-120354 filed on May 30, 2011, the content of which is hereby incorporated by reference into this application.

BACKGROUND OF THE INVENTION

This invention relates to an optical line terminal, and more particularly, to an optical line terminal for allocating a bandwidth to an optical network unit.

Optical networks are being introduced in order to address an increase in speed and bandwidth of communication networks. A passive optical network (hereinafter, referred to as PON) is proposed as the optical network to be introduced.

The PON is a system in which one of a station-side optical line terminal (hereinafter, referred to as OLT), an optical fiber, an optical splitter for branching the optical fiber, and a plurality of indoor optical network units (hereinafter, referred to as ONUs) are coupled via a point-to-multi point network in a star configuration. Representative standards of the PON include the Ethernet (trademark) PON (EPON) standardized by IEEE 802.3, and the gigabit capable PON (GPON) standardized by ITU-T G.984.

An upstream frame transmitted from the ONU toward the OLT and the downstream frame transmitted from the OLT toward the ONU are multiplexed by the wave division multiplexing (hereinafter, referred to as WDM) in the PON.

The OLT transmits the same data by means of a downstream frame to all the ONUs coupled via the optical fiber. The ONU, which has received the downstream frame, refers to the destination information contained in the downstream frame, and discards downstream frames other than downstream frames directed to the ONU itself. Then, the ONU transfers only data directed to the ONU itself contained in the downstream frame directed to the ONU itself to a user side.

Moreover, a system in which the ONU transmits an upstream frame to the OLT at a time point specified by the OLT according to a transmission permission from the OLT is proposed (see, for example, Japanese Patent Application Laid-open No. 2007-019815). The upstream frame contains data multiplexed by the time division multiple access (hereinafter, referred to as TDMA).

Moreover, the PON includes the PON communicating at a low speed of approximately 64 kbit/second, the Broadband PON (BPON) transmitting/receiving fixed-length ATM cells at a speed up to approximately 600 Mbit/second, the EPON transmitting/receiving a variable-length packet of the Ethernet at a speed up to approximately 1 Gbit/second, the GPON carrying out high-speed communication at approximately 2.4 Gbit/second, and the like. An introduction of a PON enabling a high-speed communication out of these PONs is in progress, and realization of a high-speed PON which can communicate at 10 Gbit/second to 40 Gbit/second is sought.

As the communication speed of the PON increases in this way, the power consumption of relay devices on the transmission line also increases. On the other hand, the ONU in the PON is installed in the subscriber's home, and a large number of ONUs are provided on the network. Therefore, the power consumption by the ONUs is increasing.

Moreover, the ONU requires an available bandwidth for a short period compared with the OLT and higher-level switches. Thus, the ONU may be left consuming a wasteful electric power during a non-communication state.

In view of the above-mentioned situation, a need for saving the electric power of the ONU is increasing, and an electric power saving feature for controlling the ONU to transition to a power saving (sleep) state, and also controlling the ONU to transition from the sleep state to an active state in which the upstream frame and the downstream frame can be transmitted and received by means of the control from the OLT is proposed (see, for example, Japanese Patent Application Laid-open No. 2010-114830).

SUMMARY OF THE INVENTION

When the ONU transitions from the sleep state to the active state, the ONU starts supplying an optical signal transmission circuit of the ONU with an electric power in the PON in which the above-mentioned power saving feature is implemented. Moreover, when the ONU transitions from the active state to the sleep state, the ONU stops the supply of the power to the optical signal transmission circuit of the ONU. When the supply of the electric power to the optical signal transmission circuit starts or stops, an unintended optical signal (hereinafter, referred to as erroneous light emission) can be generated from the optical signal transmission circuit.

Specifically, when the ONU transitions to the active state or to the sleep state in the ONU in which the power saving feature is implemented, a control state of the optical signal transmission unit becomes unstable due to a steep voltage fluctuation in a transient period in which the power supply to the optical signal transmission unit of the ONU starts or stops. Therefore, the erroneous light emission can be generated from the optical signal transmission unit of the ONU.

As a result of the generation of the erroneous light emission from the optical signal transmission unit, an upstream frame transmitted by another ONU can be interfered with by the erroneous light emission, and a packet loss of the upstream frame may be generated in the OLT. Thus, a possibility of the generation of the packet loss of the upstream frame increases resulting from the introduction of the power saving feature. Moreover, the possibility of the generation of the packet loss of the upstream frame further increases due to a requirement for a decrease in a startup period from the sleep state.

However, the possibility of the interference of the erroneous light emission with the upstream frame transmitted from another ONU during the power saving control is not currently pointed out, and means for avoiding risk thereof is not disclosed either.

This invention has been made in view of the above-mentioned problem, and therefore has an object to provide a PON system which does not influence transmission of an upstream frame even if an erroneous light emission is generated from an ONU when the state of the ONU transitions under the sleep control from the OLT.

A representative embodiment of this invention is a bandwidth control method employed in an optical line terminal coupled to optical network units via optical communication. The bandwidth control method includes: determining, by the optical line terminal, a first time point at which a first optical network unit of the optical network units starts the processing of transitioning between the states in a case where the first optical network unit is to be transitioned between the states; transmitting, by the optical line terminal, a state control signal containing the first time point to the first optical network unit in order to control the first optical network unit to start the processing of transitioning between the states; and stopping, by the optical line terminal, allocating a bandwidth used to transmit a signal to the optical line terminal to a second optical network unit of the plurality of optical network units other than the first optical network unit during a period from the first time point until it is determined that the first optical network unit has finished the processing of transitioning between the states.

According the embodiment of this invention, a packet loss of an upstream frame from an ONU can be prevented.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

In a PON according to embodiments of this invention, when an ONU transitions from a sleep state to an active state, or from the active state to the sleep state, an OLT controls upstream frames transmitted from ONUs other than the ONU which transitions between states in order to prevent a packet loss due to an erroneous light emission generated from the ONU.

(First Embodiment)

Figure 1:
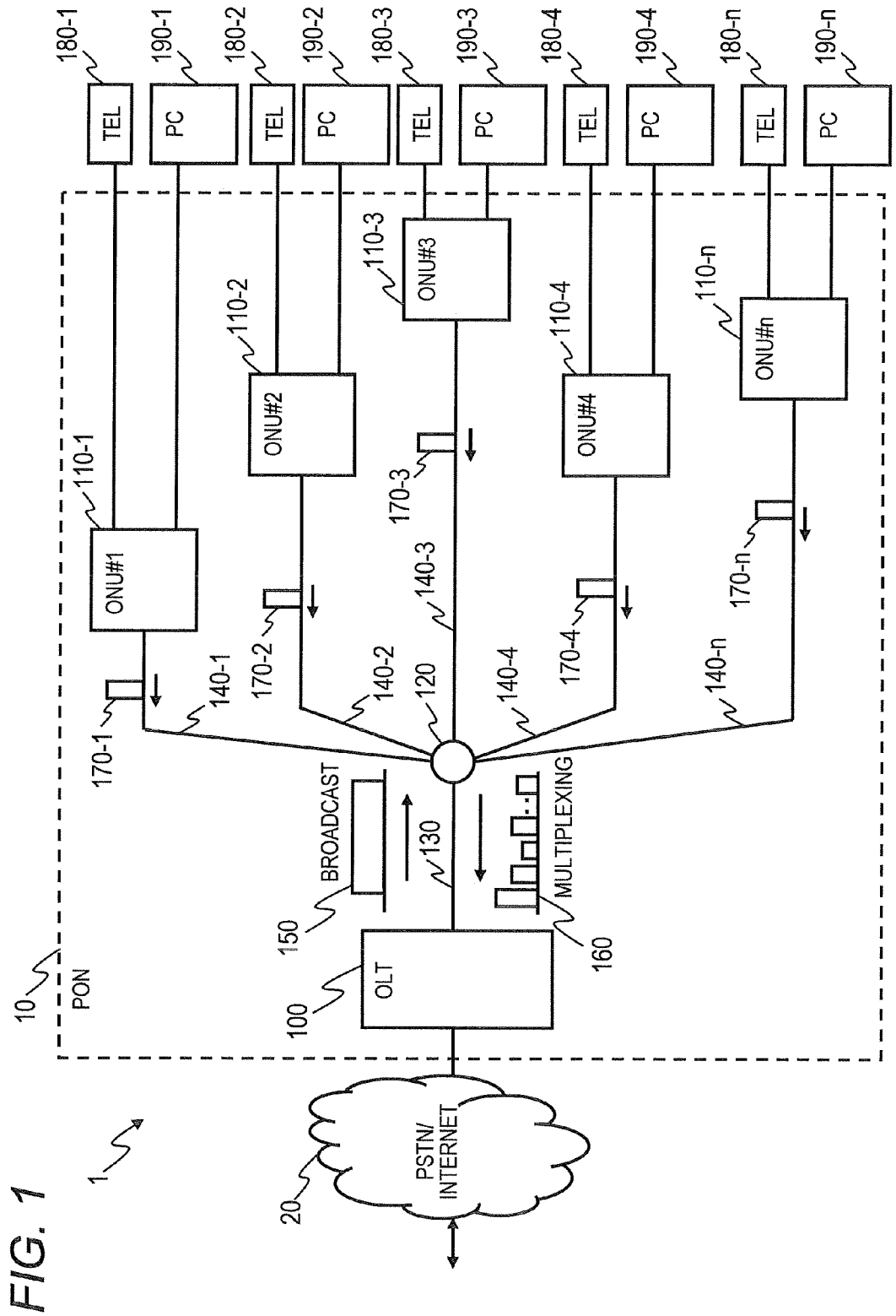
FIG. 1 is a block diagram illustrating a physical configuration of an optical access network according to a first embodiment of this invention.

FIG. 1 is a block diagram illustrating a physical configuration of an optical access network 1 according to a first embodiment of this invention.

The optical access network 1 according to this embodiment is a system for coupling a network such as the Internet and terminals of users (hereinafter, referred to as subscriber terminals) using the system of this embodiment to each other. The optical access network 1 according to this embodiment includes a PON 10, a PSTN/Internet 20 (hereinafter, referred to an upper network 20), a plurality of telephones (TELs) 180 (180-1 to 180-n), and a plurality of PCs 190 (190-1 to 190-n).

The upper network 20 is a public communication network coupled to the PON 10. The PON 10 couples the upper network 20 to the telephones 180 and the PCs 190. The telephones 180 and PCs 190 are subscriber terminals.

The PON 10 includes an OLT 100, a plurality of ONUs 110 (ONU 110-1 to ONU 110-n), an optical splitter 120, a trunk line optical fiber 130, and a plurality of branch line optical fibers 140 (branch line optical fibers 140-1 to branch line optical fiber 140-n). The OLT 100 is coupled to the upper network 20. The ONU 110 is coupled to the subscriber terminal.

The OLT 100 is coupled to the plurality of (n such as 32) ONUs 110 via the one trunk line optical fiber 130, the one optical splitter 120, and the plurality of branch line optical fibers 140. Then, the OLT 100 and each of the ONUs 110 relay communication between the upper network 20 and the subscribe terminals and the communication between the subscriber terminals.

The OLT 100 transmits the same downstream frame 150 to all the ONUs 110. The downstream frame 150 contains bandwidths used by each of the ONUs 110 for transmitting upstream frames 170. The bandwidth used to transmit the upstream frame 170 is allocated by the OLT 100 in accordance with a traffic volume from each of the ONUs 110 or the like.

Then, each of the ONUs 110 transmits the upstream frame 170 (170-1-170-n) to the OLT 100 in accordance with the bandwidths contained in the downstream frame 170. The upstream frames 170-1 to 170-n are multiplexed by the optical splitter 120, and, as a result, an upstream frame 160 is generated. Then, the upstream frame 160 is transmitted to the OLT 100.

The number of ONUs 110 illustrated in FIG. 1 is five (n=5), and each of the ONUs 110 are different in fiber length, which is the distance to the OLT 100. The ONU 110-1 illustrated in FIG. 1 is 1 kilometer in fiber length from the OLT 100, and the ONU 110-2 is 10 kilometers in fiber length from the OLT 100. Moreover, the ONU 110-3 is 20 kilometers in fiber length from the OLT 100, the ONU 110-4 is 10 kilometers in fiber length from the OLT 100, and the ONU 110-n is 15 kilometers in fiber length from the OLT 100.

Figure 2:
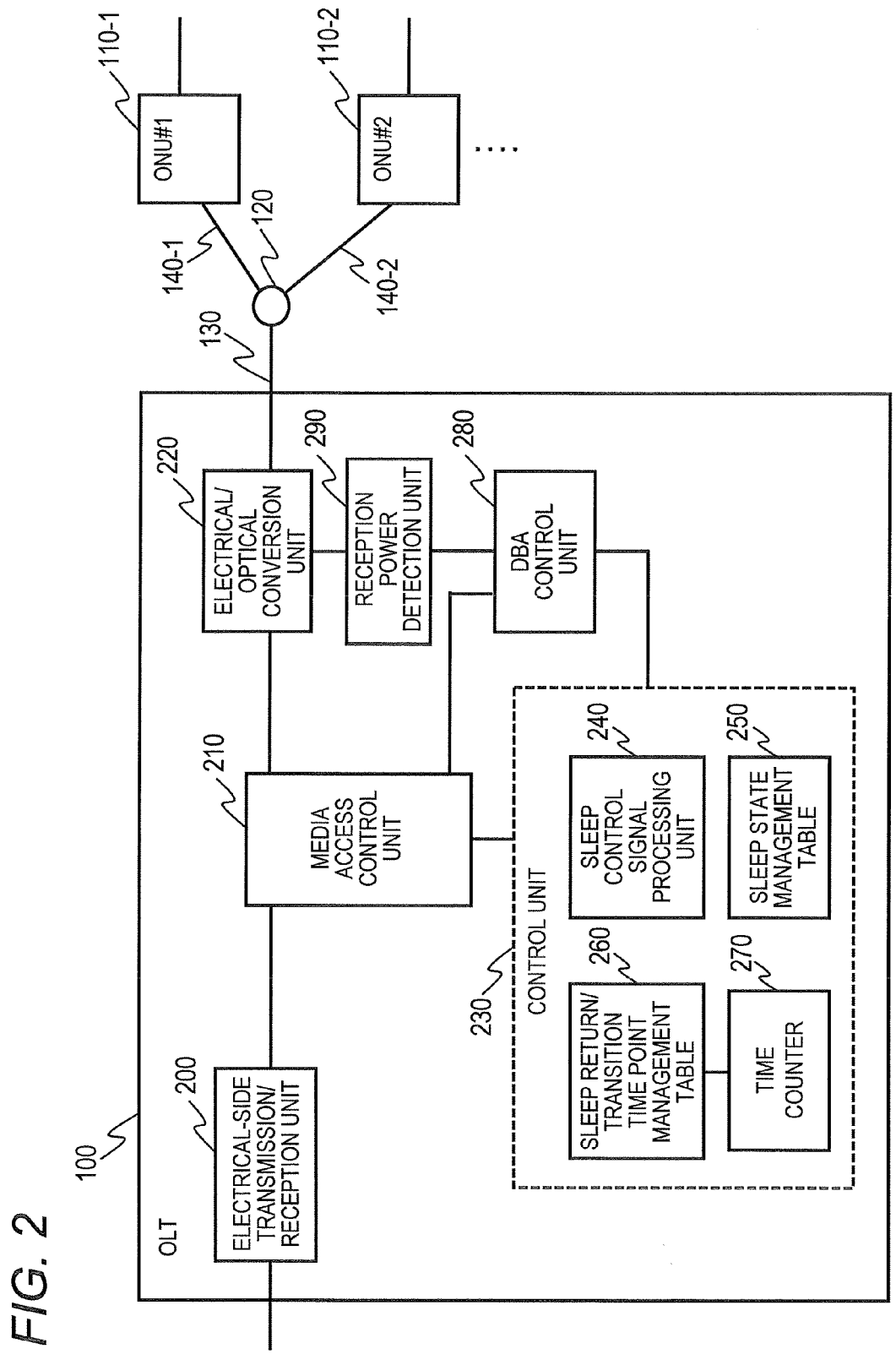
FIG. 2 is a block diagram illustrating a physical configuration of an OLT according to the first embodiment of this invention.

FIG. 2 is a block diagram illustrating a physical configuration of the OLT 100 according to the first embodiment of this invention.

The OLT 100 includes at least one processor and at least one memory. Moreover, the OLT 100 may include a non-volatile memory or the like.

The OLT 100 includes a plurality of processing units. The processing units of the OLT 100 include an electrical-side transmission/reception unit 200, a media access control unit 210, an electric/optical conversion unit 220, a control unit 230, a dynamic bandwidth allocation (DBA) control unit 280, and a reception power detection unit 290.

Each of the processing units of the OLT 100 includes a processor and a memory. Functions of each of the processing units are implemented by the processor and the memory. It should be noted that the OLT 100 according to this embodiment may implement the functions of the OLT 100 by the processor executing a program corresponding to each of the processing units on the memory.

Moreover, each of the processing units of the OLT 100 illustrated in FIG. 2 are examples, and each of the processing units may further include a plurality of processing units for implementing the functions of each of the processing units. Moreover, a plurality of processing units may be contained in a single processing unit as long as the functions of each of the processing units are implemented.

The electrical-side transmission/reception unit 200 has a function of transmitting/receiving an electric signal via a relay device contained in the upper network 20. The electric/optical conversion unit 220 is coupled to the trunk line optical fiber 130, and has a function of transmitting/receiving an optical signal to/from the ONUs 110.

The media access control unit 210 has a function of controlling the communication between the OLT 100 and the ONU 110 when the ONU 110 is in the active state or the sleep state. Moreover, the media access control unit 210 has a switching function of transmitting a downstream frame transmitted from the upper network 20 to the ONU 110. The active state refers to a state in which the ONU 110 and the OLT 100 are communicating with each other.

The DBA control unit 280 has a function of allocating, to each of the ONU 110, a bandwidth for transmitting an upstream frame in accordance with traffic of a signal (containing the upstream frame) transmitted from each of the ONUs 110. Moreover, the DBA control unit 280 generates a signal for discovering an ONU 110 in a discovery window, and scheduling transmission of the generated signal.

The reception power detection unit 290 has a function of detecting an optical intensity (optical power) when an upstream frame of each of the ONU 110 is received. The reception power detection unit 290 transmits the optical intensity of each of the ONU 110 to the DBA control unit 280 or the media access control unit 210.

The control unit 230 has a function of controlling processing units of the control unit 230. The control unit 230 includes a sleep control signal processing unit 240, a sleep state management table 250, a sleep return/transition time point management table 260, and a time counter 270. Each of the functions of the control unit 230 is coupled to the media access control unit 210 and the DBA control unit 280 via the control unit 230.

The sleep control signal processing unit 240 has a function of generating a sleep setting signal for controlling an ONU 110 to transition from the active state to the sleep state and a sleep resetting signal for controlling the ONU 110 to transition from the sleep state to the active state. Hereinafter, the sleep setting signal and the sleep resetting signal are generally referred to as sleep control signal.

The sleep state management table 250 is a table for managing the sleep state of the ONU 110. The sleep return/transition time point management table 260 is a table for holding a time point at which each of the ONUs 110 starts processing of transitioning to (returning to) the active state, and a time point at which each of the ONUs 110 starts the processing of transitioning to the sleep state. The time counter 270 has a function of managing a current time point. The sleep state management table 250 and the sleep return/transition time management table 260 are stored in a memory or a non-volatile memory, and may be stored in any form such as CSV format.

When the electric/optical conversion unit 220 receives an upstream frame transmitted by the ONU 110, the media access control unit 210 holds, as route information, the MAC address of the received upstream frame and information on the ONU 110 of the transmission source added to a preamble section of the received upstream frame. Then, the media access control unit 210 transmits the upstream frame transmitted by the ONU 110 to the upper network 20 via the electrical-side transmission/reception unit 200.

When the electrical-side transmission/reception unit 200 receives a downstream frame from the upper network 20, the media access control unit 210 refers to the MAC address of the received downstream frame, and adds identification information on an ONU 110 of a destination to the preamble section of the downstream frame based on the route information held in advance. Then, the media access control unit 210 transmits the downstream frame transmitted by the upper network 20 to the ONU 110 via the electrical/optical conversion unit 220.

Figure 3:
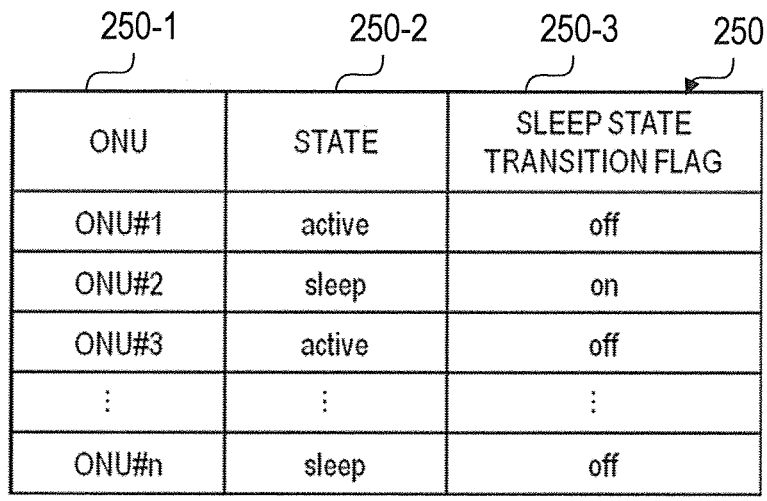
FIG. 3 is an explanatory diagram of a sleep state management table according to the first embodiment of this invention.

FIG. 3 is an explanatory diagram of the sleep state management table 250 according to the first embodiment of this invention.

The sleep state management table 250 represents whether each of the ONUs 110 is in the active state or the sleep state, and whether or not each of the ONUs 110 has finished the processing of transitioning between the states. The sleep state management table 250 is updated by the media access control unit 210 or the sleep control signal processing unit 240. The sleep state management table 250 includes ONUs 250-1, states 250-2, and sleep state transition flags 250-3.

The ONU 250-1 represents an identifier uniquely representing an ONU 110. The state 250-2 is "active" when the ONU 110 is in the active state, and "sleep" when the ONU 110 is in the sleep state.

The sleep state transition flag 250-3 represents whether or not the ONU 110 has finished the processing of transitioning between the states from the active state to the sleep state, or from the sleep state to the active state. The sleep state transition frag 250-3 is "off" when the processing of transitioning between the states has been finished, and is "on" when the processing of transitioning between the states has not been finished.

The sleep state management table 250 illustrated in FIG. 3 represents that an ONU 110 having "ONU#2" as the identifier, namely the ONU 110-2, is currently transitioning between the states from the sleep state to the active state, and has not finished the processing of transitioning between the states.

Figure 4:
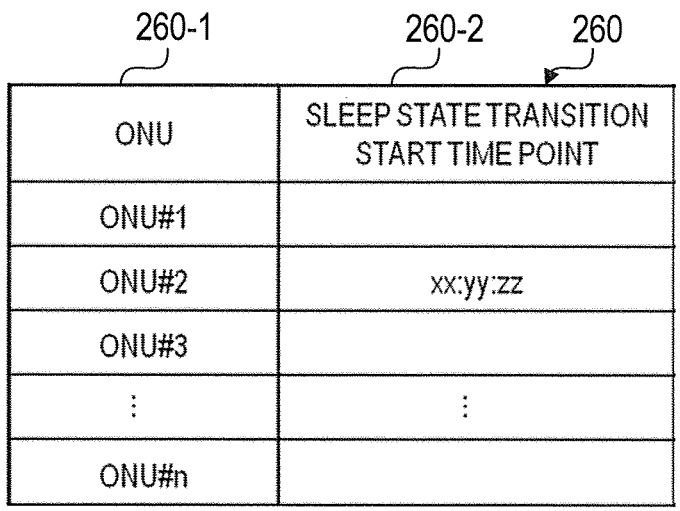
FIG. 4 is an explanatory diagram of a sleep return/transition time point management table according to the first embodiment of this invention.

FIG. 4 is an explanatory diagram of the sleep return/transition time point management table 260 according to the first embodiment of this invention.

The sleep return/transition time point management table 260 represents a time point at which an ONU 110 transitions to the sleep state. The sleep return/transition time point management table 260 is updated by the media access control unit 210. The sleep return/transition time point management table 260 includes ONUs 260-1, and sleep state transition start time points 260-2.

The ONU 260-1 represents an identifier for uniquely representing an ONU 110, and corresponds to the ONU 250-1. The sleep state transition start time point 260-2 represents a time point for starting the transition to the sleep state. The sleep return/transition time point management table 260 illustrated in FIG. 4 represents that the ONU 110-2 starts the processing of transitioning between the states at "xx (hours): yy (minutes): zz (seconds)".

Figure 5:
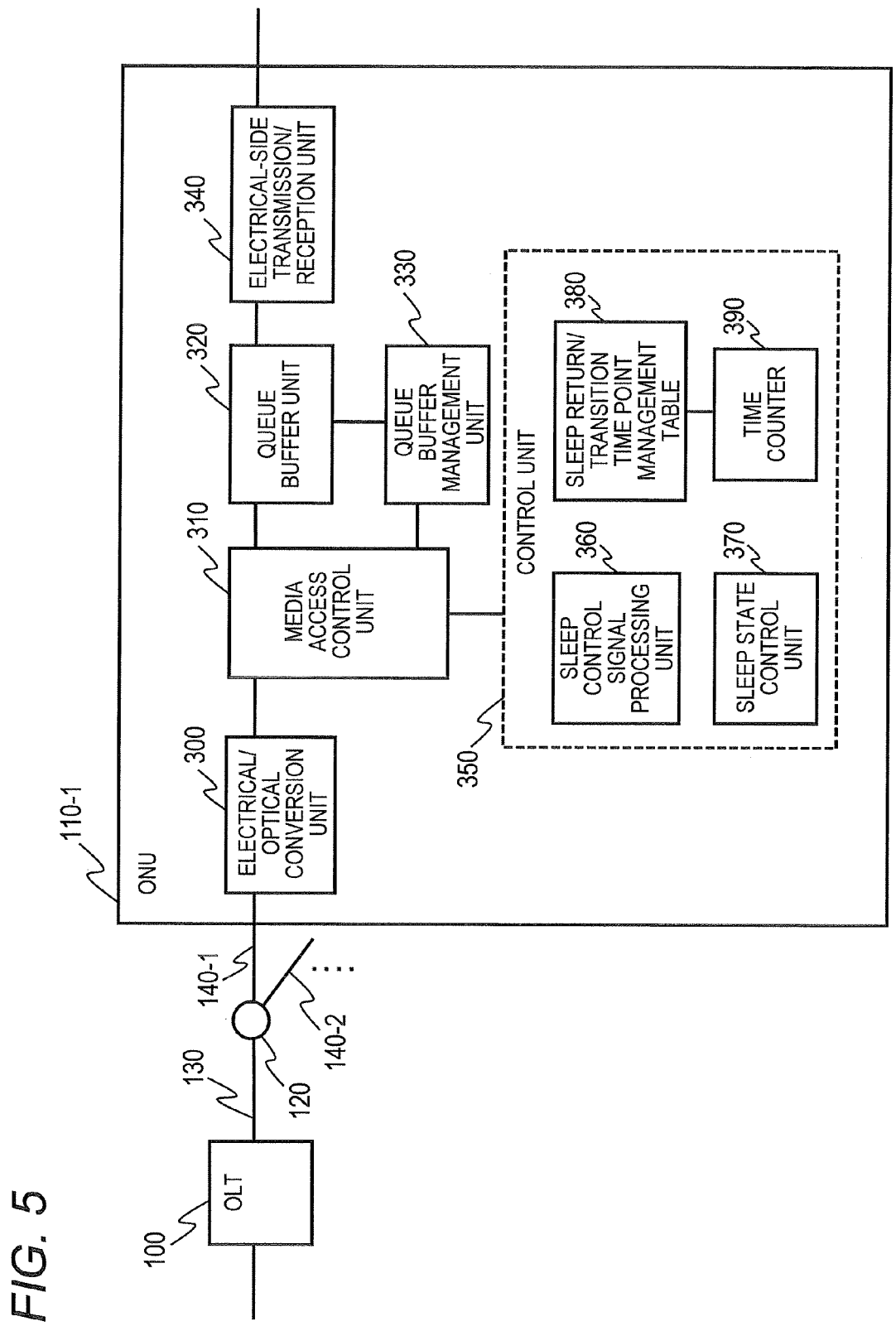
FIG. 5 is a block diagram illustrating a physical configuration of an ONU according to the first embodiment of this invention.

FIG. 5 is a block diagram illustrating a physical configuration of the ONU 110 according to the first embodiment of this invention.

FIG. 5 illustrates the ONU 110-1, but all the ONUs 110 have the same functions as those of the ONU 110-1 illustrated in FIG. 5. Therefore, hereinafter, the ONU 110-1 illustrated in FIG. 5 is referred to as ONU 110.

The ONU 110 includes at least one processor and at least one memory. Moreover, the ONU 110 may include a non-volatile memory or the like.

The ONU 110 includes a plurality of processing units. The plurality of processing units of the ONU 110 include an electrical/optical conversion unit 300, a media access control unit 310, a queue buffer unit 320, a queue buffer management unit 330, an electrical-side transmission/reception unit 340, and a control unit 350. The electrical/optical conversion unit 300 includes a function of transmitting/receiving an optical signal to/from the OLT 100. The media access control unit 310 has a function of controlling the communication between the ONU 110 and the OLT 100 in the active state and the sleep state of the ONU 110.

Each of the processing units of the ONU 110 includes a processor and a memory. Functions of each of the processing units are implemented by the processor and the memory. It should be noted that the ONU 110 according to this embodiment may implement the functions of the ONU 110 by the processor executing a program corresponding to each of the processing units on the memory.

Moreover, the respective processing units of the ONU 110 illustrated in FIG. 5 are examples, and each of the processing units may further include a plurality of processing units for implementing the functions of each of the processing units. Moreover, the plurality of processing units may be contained in a single processing unit as long as the functions of each of the processing units are implemented.

The queue buffer unit 320 stores frames contained in the data communication. The queue buffer management unit 330 includes a function of managing the queue buffer unit 320. The electrical-side transmission/reception unit 340 has a function of transmitting/receiving an electric signal to/from the telephone 180 and the PC 190.

The control unit 350 has a function of controlling processing units of the control unit 350. The control unit 350 includes a sleep control signal processing unit 360, a sleep state control table 370, a sleep return/transition time point management table 380, and a time counter 390.

The sleep control signal processing unit 360 analyzes the sleep control signal transmitted from the OLT 100. The sleep state control unit 370 starts the processing of transitioning to the sleep state or the processing of transitioning to the active state in accordance with an analysis result of the sleep control signal processing unit 360.

The sleep return/transition time point management table 380 is a table for holding a time point at which the processing of transitioning to (returning to) the active state starts, or a time point at which the processing of transitioning to the sleep state starts, which is contained in the analysis result of the sleep control signal processing unit 360. The sleep control signal transmitted from the OLT 100 is a signal generated by the sleep control signal processing unit 240, and contains a time point at which the ONU 110 starts the processing of transitioning to the active state or a time point at which the ONU 110 starts the processing of transitioning to the sleep state.

The time counter 390 has a function of managing a current time point in the ONU 110. The time counter 390 according to this embodiment is synchronized in advance with the time counter 270 of the OLT 100.

A method of synchronizing the time counter 270 and the time counter 390 with each other may be any method. In the PON according to this embodiment, the OLT 100 transmits a downstream frame containing a time point for transmitting a downstream frame to an ONU 110, and the ONU 110 which has received the downstream frame updates the time counter 270 by using the time point contained in the downstream frame as the current time point. As a result, the time counter 270 and the time counter 390 according to this embodiment are synchronized with each other.

The sleep state of the ONU 110 as used in this invention refers to a state in which the media access control unit 310 stops the power supply to the electrical/optical conversion unit 300, and stops, out of the communication between the electrical/optical conversion unit 300 and electrical/optical conversion unit 220 of the OLT 100, transmission/reception of an upstream frame containing data from a subscriber terminal or a downstream frame containing data from the upper network 20. Then, in the sleep state, the media access control unit 310 continues a function of accumulating upstream frames received by the electrical-side transmission/reception unit 340 in the queue buffer unit 320, and stops the function of transmitting a downstream frame to the telephone 180 and the PC 190, and processing of transmitting an upstream frame to the OLT 100.

When the electrical/optical conversion unit 300 determines that a downstream frame transmitted by the OLT 100 contains the sleep control signal directed to the ONU 110 to which the electrical/optical conversion unit 300 itself belongs, the electrical/optical conversion unit 300 transmits the received sleep control signal to the media access control unit 310. The media access control unit 310 transmits the sleep control signal to the sleep control signal processing unit 360.

Even in the sleep state of the ONU 110, the electrical/optical conversion unit 300 is coupled to the processing unit for determining whether or not the sleep control signal is contained in a received downstream frame, and transmits the received downstream frame to the media access control unit 310 when the sleep control signal is contained in the received downstream frame. Even in the sleep state, the processing unit for determining whether or not the sleep control signal is contained in the received downstream frame is supplied with the electric power, and is thus active.

The sleep control signal processing unit 360 analyzes the sleep control signal, and stores the time point for starting the processing of transitioning to the active state by the ONU 110, or the time point for starting the processing of transitioning to the sleep state by the ONU 110, which are contained in the sleep control signal, in the sleep return/transition time point management table 380.

Then, the sleep state control unit 370 determines whether or not the time point held in the sleep return/transition time point management table 380 and the current time point represented by the time counter 390 coincide with each other. When the current time point represented by the time counter 390 is later than the time point held in the sleep return/transition time point management table 380, the sleep state control unit 370 instructs the media access control unit 310 to transition between the states.

The sleep return/transition time point management table 380 may include the processing of transitioning between the states and a time point for starting the processing, and the sleep state control unit 370 may instruct the media access control unit 310 to transition to the sleep state or the active state in accordance with the content of the sleep return/transition time point management table 380.

When the media access control unit 310 receives an instruction to transition between the states from the sleep state control unit 370, the media access control unit 310 determines whether the state is the active state or the sleep state based on the states of the processing units to which the electric power is supplied. When the ONU 110 is in the active state, the media access control unit 310 determines to transition to the sleep state, and stops the supply of the electric power to the respective processing units. When the ONU 110 is in the sleep state, the media access control unit 310 determines to transition to the active state, and supplies the electric power to the respective processing units.

Figure 6:
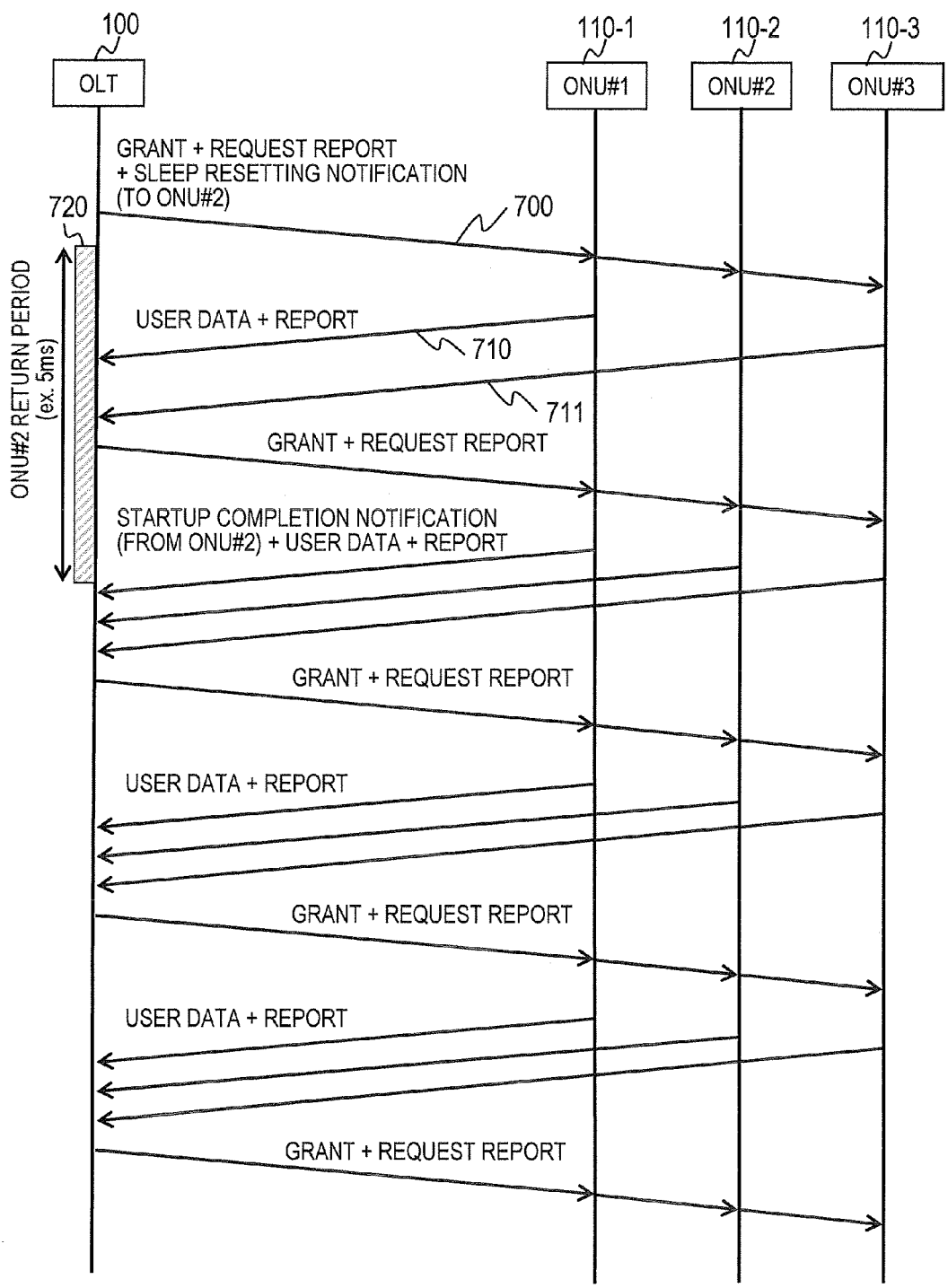
FIG. 6 is a sequence diagram illustrating processing in which the ONU transitions to an active state according to the first embodiment of this invention.

FIG. 6 is a sequence diagram illustrating processing in which the ONU 110-2 transitions to the active state according to the first embodiment of this invention.

The processing illustrated in FIG. 6 represents processing in which the OLT 100 transmits a grant signal for allocating a bandwidth used to transmit an upstream frame to the ONUs 110 (ONUs 110-1 and 110-3) other than the ONU 110-2 when the ONU 110-2 transitions from the sleep state to the active state. Then, the processing illustrated in FIG. 6 represents processing in a case where a packet loss occurs in upstream frames transmitted by the ONUs 110-1 and 110-3 due to an erroneous light emission from the ONU 110-2.

At a start of the sequence diagram of FIG. 6, the ONU 110-2 is in the sleep state.

The DBA control unit 280 of the OLT 100 adds, to a grant signal 700 for permitting each of the ONUs 110 to transmit the upstream frame, a request report representing a bandwidth used by the ONUs 110-1 and 110-3 for transmitting an upstream frame.

On this occasion, when the OLT 100 determines to control the ONU 110-2 to transition from the sleep state to the active state, the OLT 100 adds, to the grant signal 700, a sleep control signal (sleep resetting notification) representing an instruction to control the ONU 110-2 to transition from the sleep state to the active state. Then, the OLT 100 transmits the grant signal 700 to each of the ONUs 110 via the electrical/optical conversion unit 220.

When the ONU 110-2 receives the sleep resetting notification contained in the grant signal 700, the ONU 110-2 starts the transition from the sleep state to the active state in accordance with the sleep resetting notification. The state of the ONU 110-2 is unstable during a period 720 (such as 5 milliseconds) in which the ONU 110 carries out the transition.

On the other hand, the ONU 110-1 transmits an upstream frame 710 and the ONU 110-3 transmits an upstream frame 711 in accordance with the grant signal 700. Therefore, when an unintended erroneous light emission is generated from the ONU 110-2 during the period 720, the erroneous light emission interferes with the upstream frame 710 or 711, and a packet loss may occur.

Figure 7:
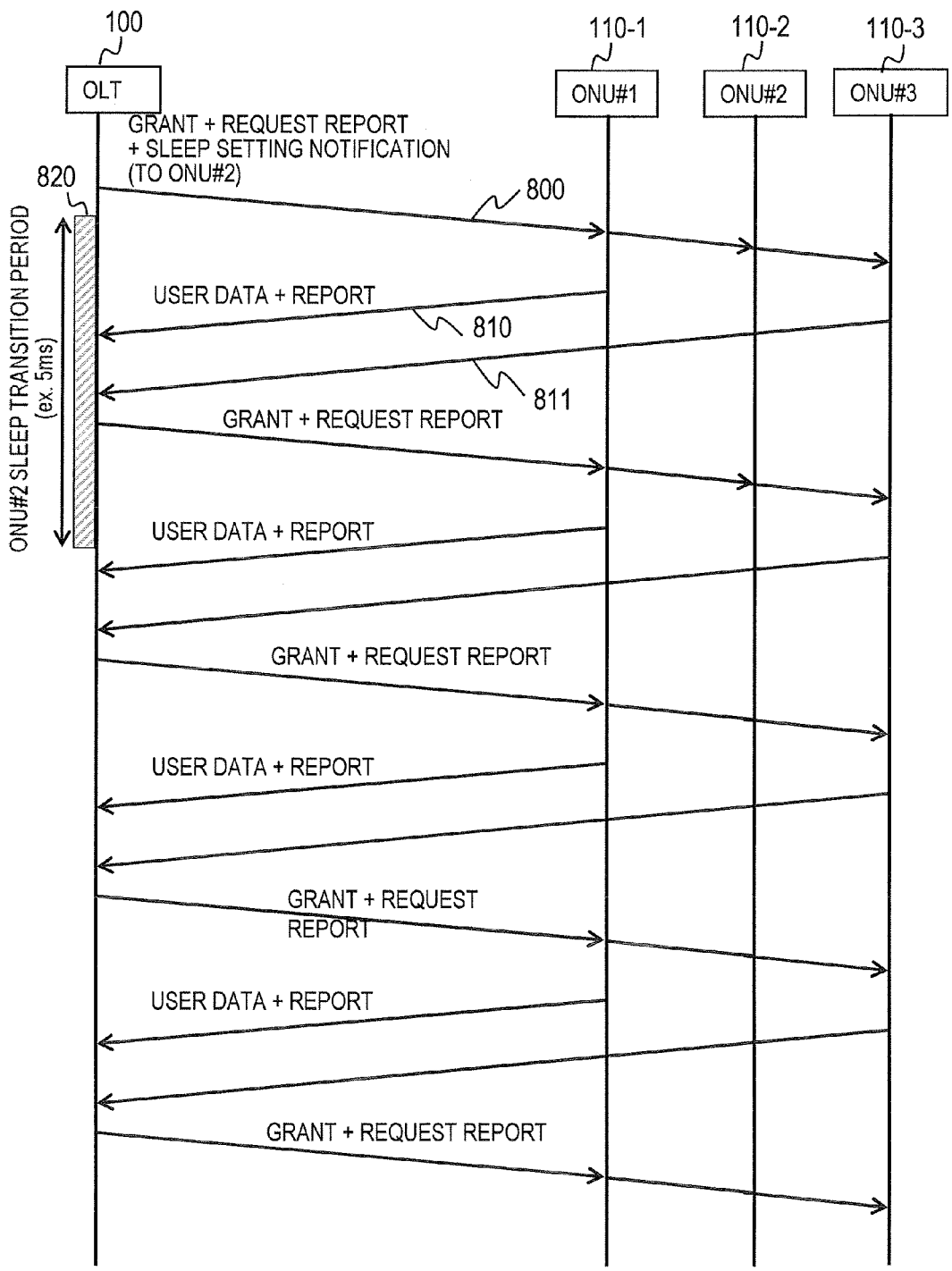
FIG. 7 is a sequence diagram illustrating processing in which the ONU transitions to the sleep state according to the first embodiment of this invention.

FIG. 7 is a sequence diagram illustrating processing in which the ONU 110-2 transitions to the sleep state according to the first embodiment of this invention.

The processing illustrated in FIG. 7 represents processing in which the OLT 100 transmits a grant signal for allocating a bandwidth used to transmit an upstream frame to the ONUs 110 (ONUs 110-1 and 110-3) other than the ONU 110-2 when the ONU 110-2 transitions from the active state to the sleep state. Then, the processing illustrated in FIG. 6 represents processing in a case where a packet loss occurs in upstream frames transmitted by the ONUs 110-1 and 110-3 due to an erroneous light emission from the ONU 110-2.

At a start of the sequence diagram of FIG. 7, the ONU 110-2 is in the active state.

The DBA control unit 280 of the OLT 100 adds, to a grant signal 800 for permitting each of the ONUs 110 to transmit the upstream frame, a request report representing a bandwidth used by the ONUs 110-1 and 110-3 for transmitting an upstream frame.

On this occasion, when the OLT 100 determines to control the ONU 110-2 to transition from the active state to the sleep state, the OLT 100 adds, to the grant signal 800, a sleep control signal (sleep setting notification) representing an instruction to control the ONU 110-2 to transition from the active state to the sleep state. Then, the OLT 100 transmits the grant signal 800 to each of the ONUs 110 via the electrical/optical conversion unit 220.

When the ONU 110-2 receives the sleep setting notification contained in the grant signal 800, the ONU 110-2 starts the transition from the active state to the sleep state in accordance with the sleep setting notification. The state of the ONU 110-2 is unstable during a period 820 (such as 5 milliseconds) in which the ONU 110 carries out the transition.

On the other hand, the ONU 110-1 transmits an upstream frame 810 and the ONU 110-3 transmits an upstream frame 811 in accordance with the grant signal 800. Therefore, when an unintended erroneous light emission is generated from the ONU 110-2 during the period 820, the erroneous light emission interferes with the upstream frame 810 or 811, and a packet loss may occur.

Hereinafter, the ONU 110 which transitions to the sleep state or the active state is the ONU 110-2.

Figure 8:
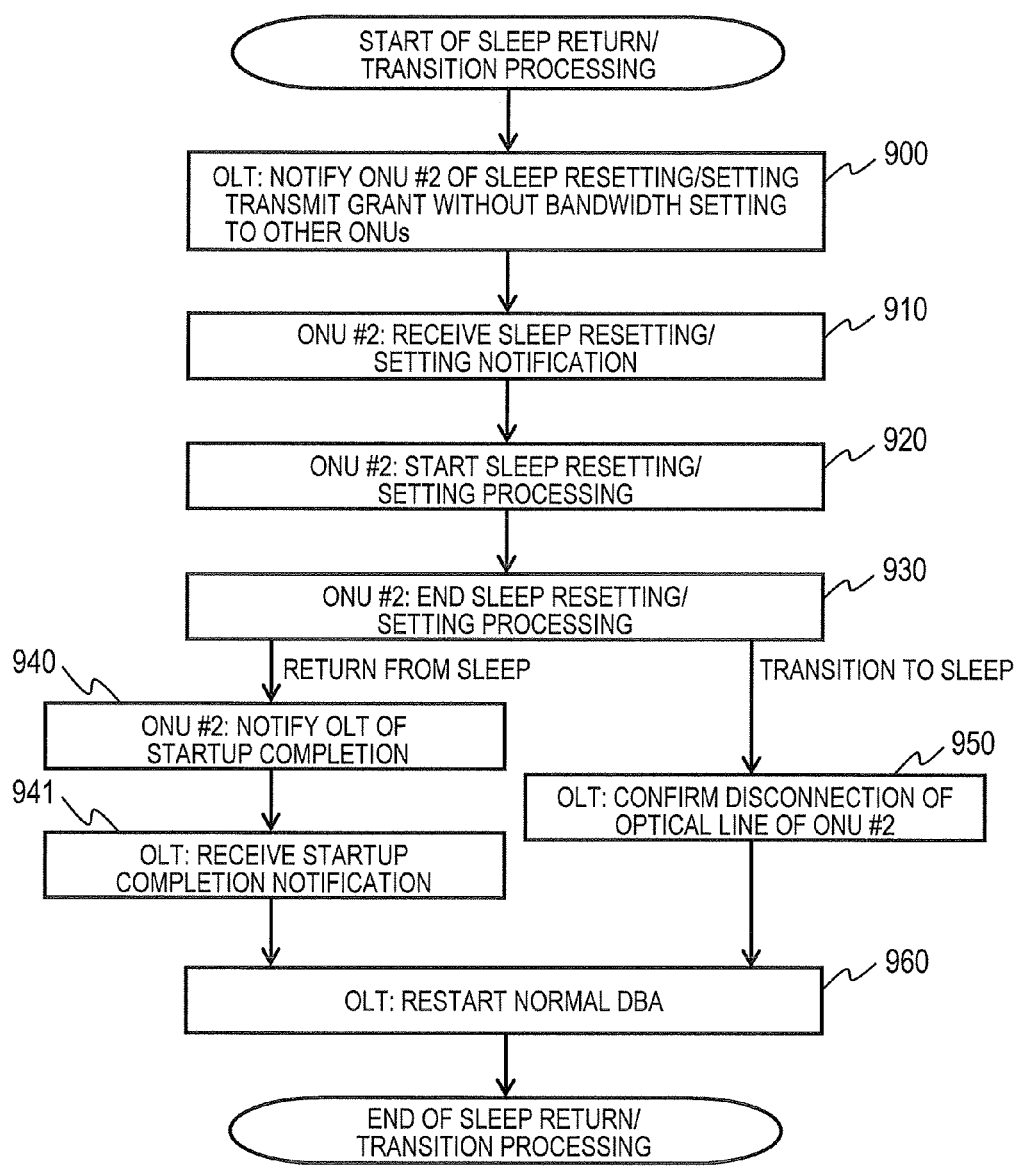
FIG. 8 is a flowchart illustrating processing in which the state of the ONU is controlled to transition according to the first embodiment of this invention.

FIG. 8 is a flowchart illustrating processing in which the state of the ONU 110-2 transitions according to the first embodiment of this invention.

The processing illustrated in FIG. 8 represents processing in which the OLT 100 does not allocate a bandwidth used for transmitting an upstream frame to the ONUs 110 other than the ONU 110-2 when the ONU 110-2 transitions from the sleep state to the active state, or from the active state to the sleep state. As a result, the OLT 100 can prevent a packet loss of the upstream frame from occurring.

The media access control unit 210 determines to control the ONU 110-2 to transition to the sleep state when the media access control unit 210 does not receive a downstream frame to the ONU 110-2 or an upstream frame from the ONU 110-2 for a predetermined period. Then, the media access control unit 210 determines a time point at which the ONU 110-2 starts processing of transitioning to the sleep state, and stores the determined time point in the sleep return/transition time point management table 260.

Moreover, when the media access control unit 210 receives downstream frames directed to the ONU 110-2 in a predetermined traffic volume, and the sleep state management table 250 represents that the ONU 110-2 is in the sleep state (the state 250-2 of the sleep state management table 250 is "sleep"), the media access control unit 210 determines to control the ONU 110-2 to transition to the active state. Then, the media access control unit 210 determines a time point at which the ONU 110-2 starts processing of transitioning to the active state, and stores the determined time point in the sleep return/transition time point management table 260.

As described above, when the media access control unit 210 determines to control the ONU 110-2 to transition to the sleep state or the active state, the media access control unit 210 instructs the sleep control signal processing unit 240 to control the ONU 110-2 to transition to the sleep state or the active state.

When the sleep control signal processing unit 240 is instructed to control the ONU 110-2 to transition to the sleep state or the active state by the media access control unit 210, the sleep control signal processing unit 240 generates the sleep control signal in accordance with the instruction from the media access control unit 210. In other words, the sleep control signal processing unit 240 generates the sleep resetting notification representing the instruction to control the ONU 110-2 to transition to the active state, or the sleep setting notification representing the instruction to control the ONU 110-2 to transition to the sleep state.

The sleep control signal processing unit 240 adds, to the sleep resetting notification or the sleep setting notification, the time point which is stored in the sleep return/transition time point management table 260, and at which the ONU 110-2 starts the processing of transitioning between the states. Moreover, the sleep control signal processing unit 240 adds, to the sleep resetting notification or the sleep setting notification, a value representing that the state of the ONU 110-2 transitions.

Then, the sleep control signal processing unit 240 transmits the generated sleep resetting notification or sleep setting notification, namely the sleep control signal, to the DBA control unit 280. Further, the sleep control signal processing unit 240 changes the value of the sleep state transition flag 250-3 corresponding to the ONU 110-2 in the sleep state management table 250 to "on". As a result, the OLT 100 can recognize that the state of the ONU 110-2 is transitioning.

When the sleep control signal is transmitted to the DBA control unit 280 from the sleep control signal processing unit 240, the DBA control unit 280 generates a grant signal in accordance with the content of the sleep control signal. Specifically, the DBA control unit 280 acquires the ONU 110 (ONU 110-2) represented by the sleep control signal. Then, the DBA control unit 280 generates a grant signal representing that a bandwidth used to transmit an upstream frame is not allocated to the ONUs 110 other than the acquired ONU 110-2.

The generated grant signal contains the sleep control signal. Then, the DBA control unit 280 transmits the generated grant signal to each of the ONUs 110 via the electrical/optical conversion unit 220 (Step 900).

When the media access control unit 310 of the ONU 110-2 receives the sleep control signal contained in the grant signal (Step 910), the media access control unit 310 of the ONU 110-2 starts the processing of transitioning to the sleep state or the active state at the time point contained in the sleep control signal as described above (Step 920).

After Step 900, until the ONU 110-2 finishes the processing of transitioning to the sleep state or the active state, the OLT 100 controls the DBA control unit 280 to transmit the grant signal representing that a bandwidth used to transmit an upstream frame is not allocated to the ONUs 110 other than the ONU 110-2 to each of the ONUs 110. As a result, the bandwidth used to transmit an upstream frame is not allocated by the grant signal while the ONU 110-2 is transitioning between the states, and hence the ONUs 110 other than the ONU 110-2 cannot transmit an upstream frame to the OLT 100.

In the above description, the DBA control unit 280 does not allocate a bandwidth used to transmit an upstream frame to the ONUs 110 other than the ONUs 110-2 after the transmission of the sleep control signal. However, it is only necessary for the DBA control unit 280 according to this embodiment not to allocate a bandwidth used to transmit an upstream frame to the ONUs 110 other than the ONU 110-2 at a time point when the ONU 110-2 starts the processing of transitioning between the states. Therefore, the OLT 100 according to this embodiment may subtract a predetermined period from the time point at which the processing of transitioning between the states starts, and from a time point represented by a subtraction result, may stop allocating a bandwidth used to transmit an upstream frame to ONUs 110 other than the ONU 110-2.

Specifically, in Step 900, the sleep control signal processing unit 240 may not change the value of the sleep state transition flag 250-3 in the sleep state management table 250 to "on". Then, the sleep control signal processing unit 240 subtracts the period predetermined by an administrator or the like from the sleep state transition start time point 260-2 in the sleep return/transition time management table 260, and, when the time point represented by the time counter 270 coincides with the time point represented by the subtraction result, may change the value of the sleep state transition flag 250-3 in the sleep state management table 250 to "on". As a result, the DBA control unit 280 can control the allocation of the bandwidth to the ONUs 110 other than the ONU 110-2 by means of the processing illustrated in FIG. 9 to be described later.

After the ONU 110-2 finishes the processing of transitioning to the active state (Step 930), the ONU 110-2 transmits a startup completion notification representing that the processing of transitioning to the active state has been finished to the OLT 100 (Step 940).

After the media access control unit 210 of the OLT 100 receives the startup completion notification transmitted from the ONU 110-2 (Step 941), the media access control unit 210 of the OLT 100 updates the value of the state 250-2 corresponding to the ONU 110-2 in the sleep state management table 250 to "active", and updates the value of the sleep state transition flag 250-3 to "off". As a result, the DBA control unit 280 of the OLT 100 carries out the normal DBA processing. In other words, after the OLT 100 receives the startup completion notification, the DBA control unit 280 allocates bandwidths used to transmit an upstream frame to ONUs 110 other than the ONU 110-2 (Step 960).

After the ONU 110-2 finishes the processing of transitioning to the sleep state (Step 930), the media access control unit 210 of the OLT 100 detects that the communication to/from the ONU 110-2 is disconnected (Step 950).

A method of detecting, by the OLT 100, the disconnection of the communication to/from the ONU 110-2 is described below.

In the active state, the ONU 110-2 transmits a signal for reporting the reception of the grant signal by the ONU 110-2 to the OLT 100. Therefore, when the media access control unit 210 of the OLT 100 receives the signal reporting the reception of the grant signal from the ONU 110-2, the media access control unit 210 determines that the communication to/from the ONU 110-2 is possible. Then, when the media access control unit 210 does not receive the signal reporting the reception of the grant signal from the ONU 110-2 in a predetermine period (period predetermined by the administrator or the like), the media access control unit 210 determines that the communication to/from the ONU 110-2 is disconnected.

In Step 950, the media access control unit 210 of the OLT 100 detects the disconnection of the communication to/from the ONU 110-2 by determining that the signal reporting the reception of the grant signal is not received from the ONU 110-2.

After the media access control unit 210 of the OLT 100 detects the disconnection of the communication to/from the ONU 110-2, the media access control unit 210 updates the value of the state 250-2 corresponding to the ONU 110-2 in the sleep state management table 250 to "sleep", and updates the value of the sleep state transition flag 250-3 to "off". As a result, the DBA control unit 280 of the OLT 100 carries out the normal DBA processing.

In other words, after the OLT 100 detects the disconnection of the communication to/from the ONU 110-2, the OLT 100 allocates bandwidths used to transmit an upstream frame to the ONUs 110 other than the ONU 110-2 (Step 960).

Figure 9:
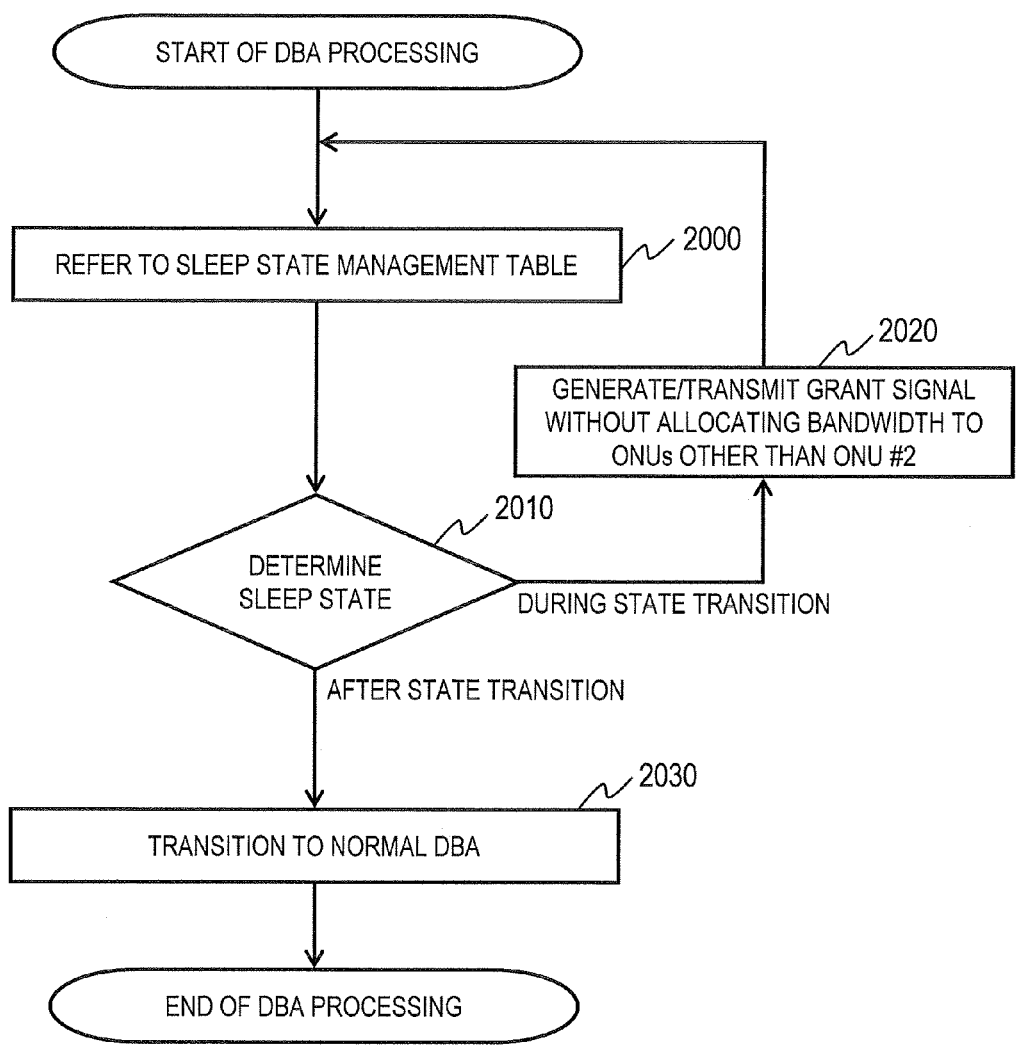
FIG. 9 is a flowchart illustrating bandwidth allocation processing by a DBA control unit according to the first embodiment of this invention.

FIG. 9 is a flowchart illustrating the bandwidth allocation processing by the DBA control unit 280 according to the first embodiment of this invention.

The DBA control unit 280 allocates a bandwidth used to transmit an upstream frame to each of the ONUs 110 at a cycle predetermined by the administrator or the like, and transmits a signal representing the allocated bandwidth to each of the ONUs 110.

When the DBA control unit 280 allocates a bandwidth to each of the ONUs 110, the DBA control unit 280 starts the processing illustrated in FIG. 9. Then, the DBA control unit 280 refers to the sleep state transition flag 250-3 in the sleep state management table 250 (Step 2000). Then, the DBA control unit 280 determines whether or not the value of the sleep state transition flag 250-3 contains "on" (Step 2010).

When the value of the sleep state transition flag 250-3 contains "on", the state of at least one of the ONUs 110 is in transition, and the DBA control unit 280 generates a grant signal for not allocating a bandwidth to the ONUs 110 other than an ONU 110 (ONU 110-2) having "on" as the value of the sleep state transition flag 250-3, and transmits the generated grant signal to each of the ONUs 110 at a predetermined cycle (Step 2020).

In FIG. 3, an ONU 110 having "on" as the value of the sleep state transition frag 250-3 is only the ONU 110-2, but "on" may be stored in the sleep state transition flags 250-3 corresponding to a plurality of ONUs 110.

Even when "on" is stored in the sleep state transition flags 250-3 corresponding to the plurality of ONUs 110, in Step 2020, the DBA control unit 280 generates a grant signal for not allocating a bandwidth to ONUs 110 other than the ONUs 110 having "on" as the value of the sleep state transition frag 250-3.

When the value of the sleep state transition flag 250-3 does not contain "on", there is no ONU 110 transitioning its state, the DBA control unit 280 carries out the normal DBA processing. In other words, when the value of the sleep state transition flag 250-3 does not include "on", the DBA control unit 280 generates a grant signal for allocating a bandwidth to all ONUs 110 which need to transmit an upstream frame, and transmits the generated grant signal to each of the ONUs 110 at a predetermined cycle (Step 2030).

While the state of the ONU 110-2 is transitioning in the processing of FIGS. 8 and 9, the OLT 100 does not allocate a bandwidth used to transmit an upstream frame to the ONUs 110 other than the ONU 110-2, and an upstream frame is thus not transmitted from the ONUs 110 other than the ONU 110-2. Therefore, it is possible to prevent a packet loss due to the erroneous light emission generated while the state of the ONU 110-2 is transitioning.

Figure 10:
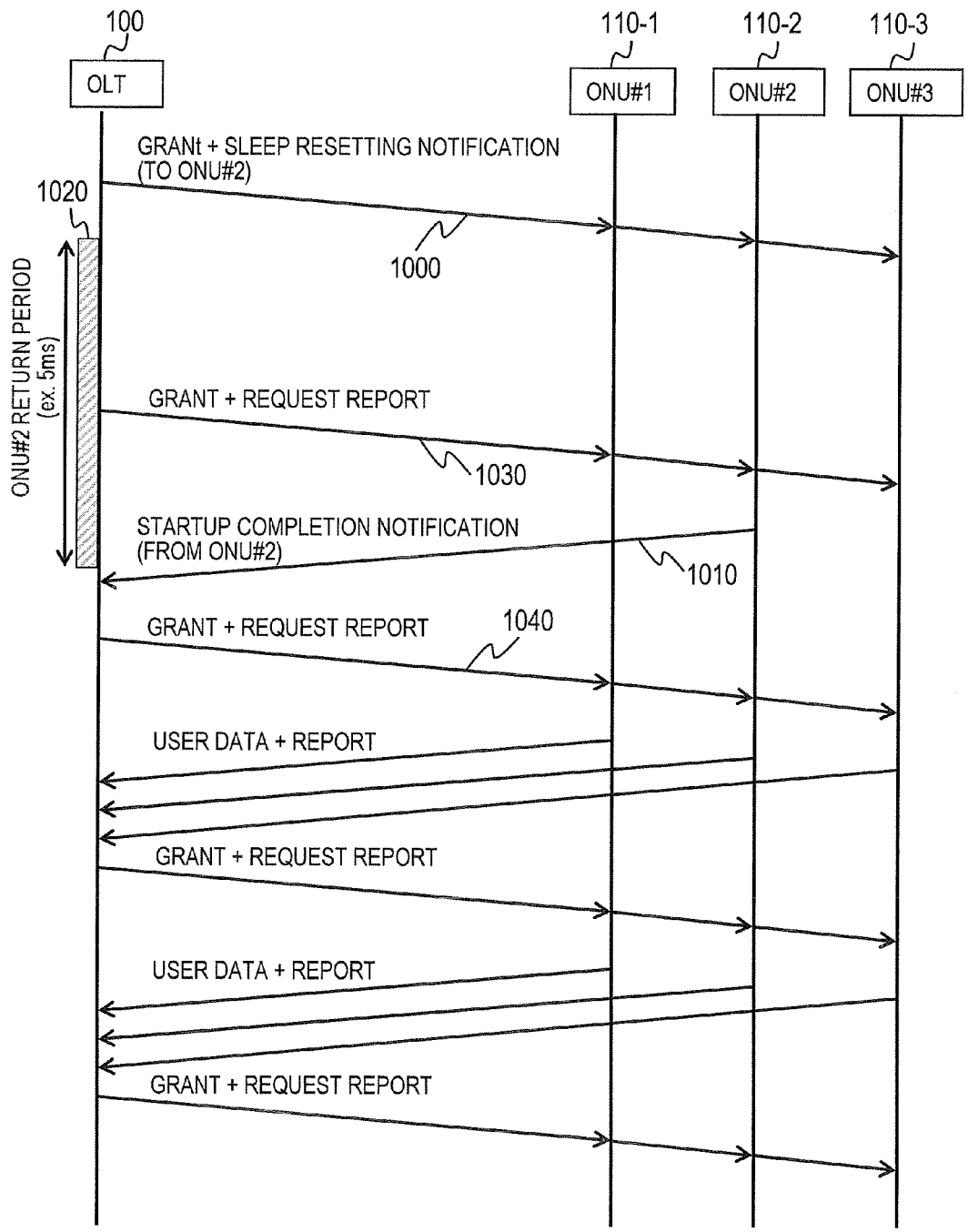
FIG. 10 is a sequence diagram illustrating processing in which upstream frames transmitted from ONUs are controlled when the ONU transitions to the active state according to the first embodiment of this invention.

FIG. 10 is a sequence diagram illustrating processing in which upstream frames transmitted from ONUs 110 are controlled when the ONU 110-2 transitions to the active state according to the first embodiment of this invention.

FIG. 10 is a sequence diagram of the OLT 100 and each of the ONUs 110 when the processing of FIGS. 8 and 9 is carried out. FIG. 10 illustrates processing for controlling the bandwidth allocation to the ONUs 110-1 and 110-3 other than the ONU 110-2 while the ONU 110-2 is transitioning to the active state.

When the OLT 100 determines to control the state of the ONU 110-2 to transition to the active state as in Step 900 of FIG. 8, the OLT 100 transmits a grant signal 1000 containing the sleep resetting notification directed to the ONU 110-2 to each of the ONUs 110. The grant signal 1000 represents that a bandwidth is not allocated to the ONUs 110 other than the ONU 110-2.

When the ONU 110-2 receives the grant signal 1000, the ONU 110-2 starts the processing of transitioning from the sleep state to the active state. A bandwidth used to transmit an upstream frame is not allocated to the ONUs 110 other than the ONU 110-2 during a period 1020 (such as 5 milliseconds) in which the ONU 110-2 transitions to the active state.

Moreover, the OLT 100 transmits, to each of the ONUs 110, a grant signal 1030 for not allocating a bandwidth used to transmit an upstream frame to the ONUs 110 other than the ONU 110-2 until the OLT 100 receives a startup completion notification 1010 from the ONU 110-2.

Therefore, during the period 1020, though the state of the ONU 110-2 is unstable, the OLT 100 can prevent an unintended erroneous light emission generated by the ONU 110-2 from interfering with an upstream frame transmitted from the ONUs 110 (ONUs 110-1 and 110-3) other than the ONU 110-2 by means of the above-mentioned processing.

After all functions transition to the active state in the ONU 110-2, the ONU 110-2 transmits the startup completion notification 1010 to the OLT 100. The OLT 100 receives the startup completion notification 1010 transmitted from the ONU 110-2, thereby confirming the transition to the active state of the ONU 110-2. Then, the OLT 100 carries out the normal DBA processing. Specifically, after the OLT 100 receives the startup completion notification 100, the OLT 100 transmits a grant signal 1040 for allocating a bandwidth used to transmit an upstream frame depending on the necessity of each of the ONUs 110.

Figure 11:
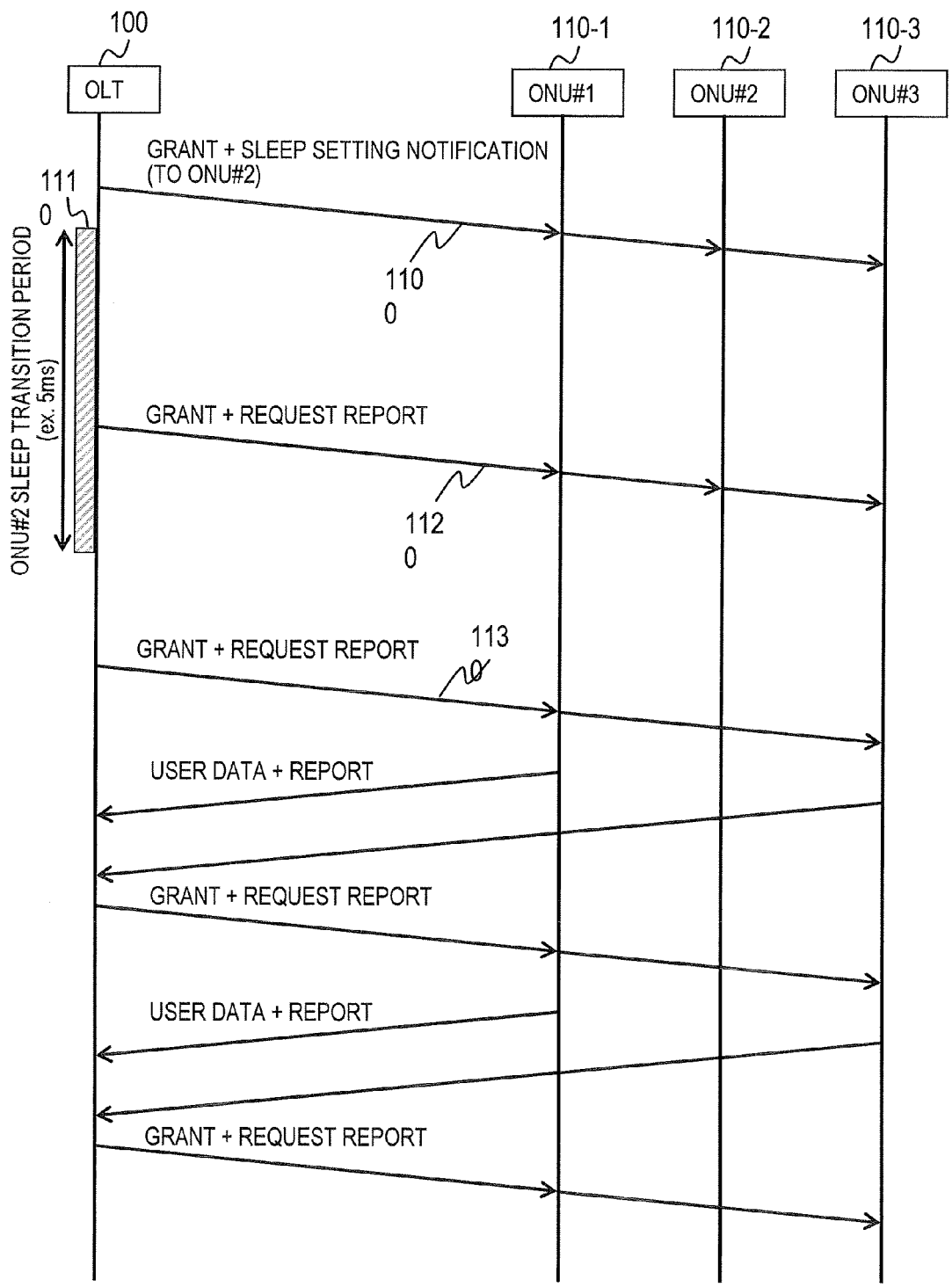
FIG. 11 is a sequence diagram illustrating processing in which upstream frames transmitted from ONUs are controlled when the ONU transitions to the sleep state according to the first embodiment of this invention.

FIG. 11 is a sequence diagram illustrating processing in which upstream frames transmitted from ONUs 110 are controlled when the ONU 110-2 transitions to the sleep state according to the first embodiment of this invention.

FIG. 11 is a sequence diagram of the OLT 100 and each of the ONUs 110 when the processing of FIGS. 8 and 9 is carried out. FIG. 11 illustrates processing for controlling bandwidths to the ONUs 110-1 and 110-3 other than the ONU 110-2 while the ONU 110-2 is transitioning to the sleep state.

When the OLT 100 determines to control the state of the ONU 110-2 to transition to the sleep state as in Step 900 of FIG. 8, the OLT 100 transmits a grant signal 1100 containing the sleep setting notification directed to the ONU 110-2 to each of the ONUs 110. The grant signal 1100 represents that a bandwidth is not allocated to the ONUs 110 other than the ONU 110-2.

When the ONU 110-2 receives the grant signal 1100, the ONU 110-2 starts the processing of transitioning from the active state to the sleep state. Bandwidths are not allocated to the ONUs 110 other than the ONU 110-2 during a period 1110 (such as 5 milliseconds) in which the ONU 110-2 transitions to the sleep state.

Moreover, the OLT 100 transmits, to each of the ONUs 110, a grant signal 1120 for not allocating a bandwidth used to transmit an upstream frame to the ONUs 110 other than the ONU 110-2 until the OLT 100 determines that the communication to/from the ONU 110-2 is disconnected.

Therefore, during the period 1110, though the state of the ONU 110-2 is unstable, the OLT 100 can prevent an erroneous light emission generated by the ONU 110-2 from interfering with an upstream frame transmitted from the ONUs 110 (ONUs 110-1 and 110-3) other than the ONU 110-2 by means of the above-mentioned processing.

When the OLT 100 detects that the communication to/from the ONU 110-2 is disconnected, the OLT 100 determines that the ONU 110-2 has transitioned to the sleep state. Then, the OLT 100 carries out the normal DBA processing. Specifically, after the OLT 100 determines that the ONU 110-2 has transitioned to the sleep state, the OLT 100 transmits, to each of the ONUs 110, a grant signal 1130 for allocating a bandwidth used to transmit an upstream frame, depending on the necessity of each of the ONUs 110.

According to the first embodiment, during the period in which the ONU 110 transitions from the active state to the sleep state or from the sleep state to the active state, even when an unintended erroneous light emission is generated from the ONU 110 transitioning its state, the control of the OLT 100 can prevent a packet loss of the upstream frame from other ONUs 110.

(Second Embodiment)

According to a second embodiment of this invention, the OLT 100 performs control so that the period in which the ONU 110 transitions to the sleep state, or the period in which the ONU 110 transitions to the active state is included in a period during which the discovery is carried out. This configuration can prevent an unintended erroneous light emission from occurring, which results in prevention of a packet loss of an upstream frame from other ONUs 110 when the ONU 110 transitions to the sleep state or the active state.

The OLT 100 in the PON carries out the discovery for a newly-coupled ONU 110, thereby recognizing a newly coupled ONU 110. The discovery is periodically carried out for a predetermined period, and the cycle of starting the discovery, and the period during which the discovery is carried out are defined in advance by the administrator or the like.

Hereinafter, the period during which the discovery is carried out is referred to as discovery window. In the discovery window, the OLT 100 does not allocate a bandwidth used to transmit an upstream frame to existing ONUs 110 in order to transmit/receive a signal to/from a newly coupled ONU 110.

Figure 12:
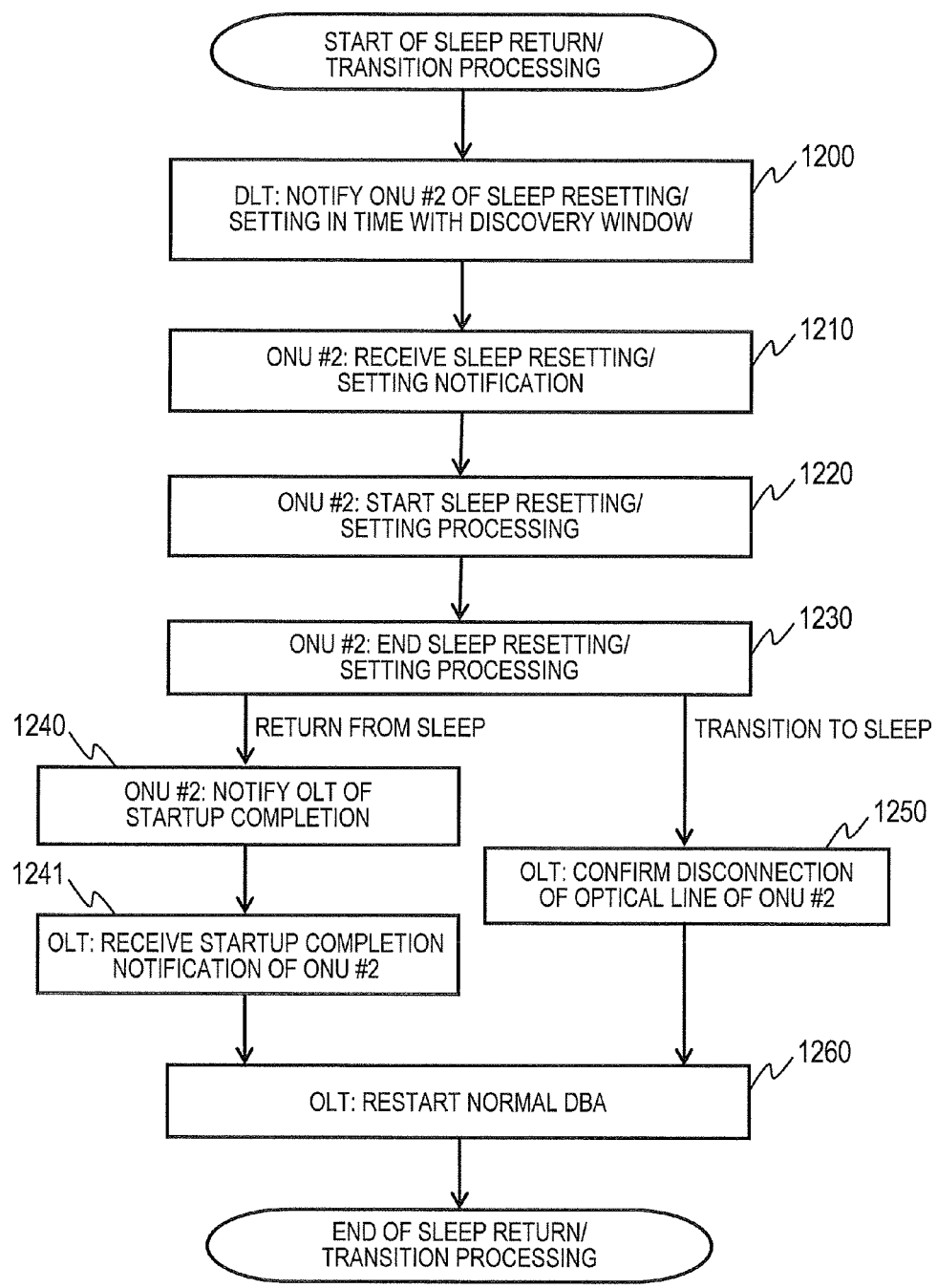
FIG. 12 is a flowchart illustrating processing in which the state of the ONU is controlled to transition according to a second embodiment of this invention.

FIG. 12 is a flowchart illustrating processing in which the state of the ONU 110-2 transitions according to the second embodiment of this invention.

The processing illustrated in FIG. 12 illustrates processing by the OLT 100 and the ONU 110-2 for controlling the state of the ONU 110-2 to transition.

The media access control unit 210 determines to control the ONU 110-2 to transition to the sleep state when the media access control unit 210 does not receive a downstream frame to the ONU 110-2 or an upstream frame from the ONU 110-2 for a period predetermined by the administrator or the like. Then, the media access control unit 210 acquires a time point at which the discovery window starts, and a time point at which the discovery window ends from the DBA control unit 280.

The DBA control unit 280 according to the second embodiment holds the cycle of starting the discovery, and the period during which the discovery is carried out, which are predetermined by the administrator or the like. Then, the DBA control unit 280 may calculate the time point at which the discovery starts and the time point at which the discovery ends based on the cycle of starting the discovery and the period during which the discovery is carried out.

Then, the media access control unit 210 determines a time point at which the ONU 110-2 starts the processing of transitioning to the sleep state so that the time point is included between the acquired time point at which the discovery window starts and the acquired time point at which the discovery window ends. Then, the media access control unit 210 stores the determined time point in the sleep return/transition time point management table 260, and instructs the sleep control signal processing unit 240 to control the ONU 110-2 to transition to the sleep state.

Moreover, when the media access control unit 210 receives downstream frames directed to the ONU 110-2 in a predetermined traffic volume, and the sleep state management table 250 represents that the ONU 110-2 is in the sleep state (the state 250-2 of the sleep state management table 250 is "sleep"), the media access control unit 210 determines to control the ONU 110-2 to transition to the active state. Then, the media access control unit 210 acquires the time point at which the discovery window starts from the DBA control unit 280.

Then, the media access control unit 210 determines a time point at which the ONU 110-2 starts the processing of transitioning to the active state so that the time point is included in the acquired period during which the discovery is carried out. Then, the media access control unit 210 stores the determined time point in the sleep return/transition time point management table 260. Then, the media access control unit 210 stores the determined time point in the sleep return/transition time point management table 260, and instructs the sleep control signal processing unit 240 to control the ONU 110-2 to transition to the active state.

When the sleep control signal processing unit 240 is instructed to control the ONU 110-2 to transition to the sleep state or the active state by the media access control unit 210, the sleep control signal processing unit 240 generates the sleep control signal in accordance with the instruction from the media access control unit 210. In other words, the sleep control signal processing unit 240 generates the sleep resetting notification representing the instruction to control the ONU 110-2 to transition to the active state, or the sleep setting notification representing the instruction to control the ONU 110-2 to transition to the sleep state.

The sleep control signal processing unit 240 adds, to the sleep resetting notification or the sleep setting notification, the time point which is stored in the sleep return/transition time point management table 260, and at which the ONU 110-2 starts the processing of transitioning between the states. Moreover, the sleep control signal processing unit 240 adds, to the sleep resetting notification or the sleep setting notification, a value representing that the state of the ONU 110-2 transitions.

Then, the sleep control signal processing unit 240 transmits the generated sleep resetting notification or sleep setting notification, namely the sleep control signal, to the DBA control unit 280.

Further, the sleep control signal processing unit 240 changes the value of the sleep state transition flag 250-3 corresponding to the ONU 110-2 in the sleep state management table 250 to "on". As a result, the OLT 100 can recognize that the state of the ONU 110-2 is transitioning.

When the DBA control unit 280 receives the sleep control signal from the sleep control signal processing unit 240, the DBA control unit 280 transmits the received sleep control signal as a sleep control signal directed to the ONU 110-2 (Step 1200).

In Step 1200, the DBA control unit 280 may transmit the sleep control signal to the ONU 110-2 before the discovery window starts. Moreover, the DBA control unit 280 may subtract a period predetermined by the administrator or the like from the time point at which the processing of transitioning between the states starts, which is contained in the sleep control signal, and transmit the sleep control signal at a time point represented by a result of the subtraction.

In other words, as long as the sleep control signal is received by the ONU 110-2 by the time point at which the processing of transitioning between the states starts, the DBA control unit 280 may transmit the sleep control signal at any time point.

After the media access control unit 310 of the ONU 110-2 receives the sleep control signal (Step 1210), as described above, the media access control unit 310 starts the processing of transitioning to the sleep state or the active state at the time point contained in the sleep control signal (Step 1220). The OLT 100 is carrying out the discovery at the time point contained in the sleep control signal, and the OLT 100 can thus maximally reduce the interference with an upstream frame even when an erroneous light emission is generated from the ONU 110-2.

The OLT 100 continues the discovery until the ONU 110-2 finishes the processing of transitioning to the sleep state or the active state after Step 1220. As a result, the bandwidth used to transmit an upstream frame is not allocated by the OLT 100 while the ONU 110-2 is transitioning between the states, and the ONUs 110 other than the ONU 110-2 cannot transmit an upstream frame to the OLT 100.

After the ONU 110-2 finishes the processing of transitioning to the active state (Step 1230), the ONU 110-2 transmits a startup completion notification representing that the processing of transitioning to the active state has been finished to the OLT 100 (Step 1240).

After the media access control unit 210 of the OLT 100 receives the startup completion notification transmitted from the ONU 110-2 (Step 1241), the media access control unit 210 of the OLT 100 updates the value of the state 250-2 corresponding to the ONU 110-2 to "active", and updates the value of the sleep state transition flag 250-3 to "off" in the sleep state management table 250. As a result, the DBA control unit 280 of the OLT 100 carries out the normal DBA processing. In other words, after the DBA control unit 280 receives the startup completion notification, the DBA control unit 280 ends the discovery window (Step 1260).

After the ONU 110-2 finishes the processing of transitioning to the sleep state (Step 1230), the media access control unit 210 of the OLT 100 detects that the communication to/from the ONU 110-2 is disconnected (Step 1250). The method of detecting the disconnection of the communication to/from the ONU 110-2 is the same as that in Step 950.

After the media access control unit 210 of the OLT 100 detects the disconnection of the communication to/from the ONU 110-2, the media access control unit 210 updates the value of the state 250-2 corresponding to the ONU 110-2 to "sleep", and updates the value of the sleep state transition flag 250-3 to "off" in the sleep state management table 250. As a result, the DBA control unit 280 of the OLT 100 carries out the normal DBA processing. In other words, after the media access control unit 210 detects the disconnection of the communication to/from the ONU 110-2, the media access control unit 210 ends the discovery window (Step 1260).

Figure 13:
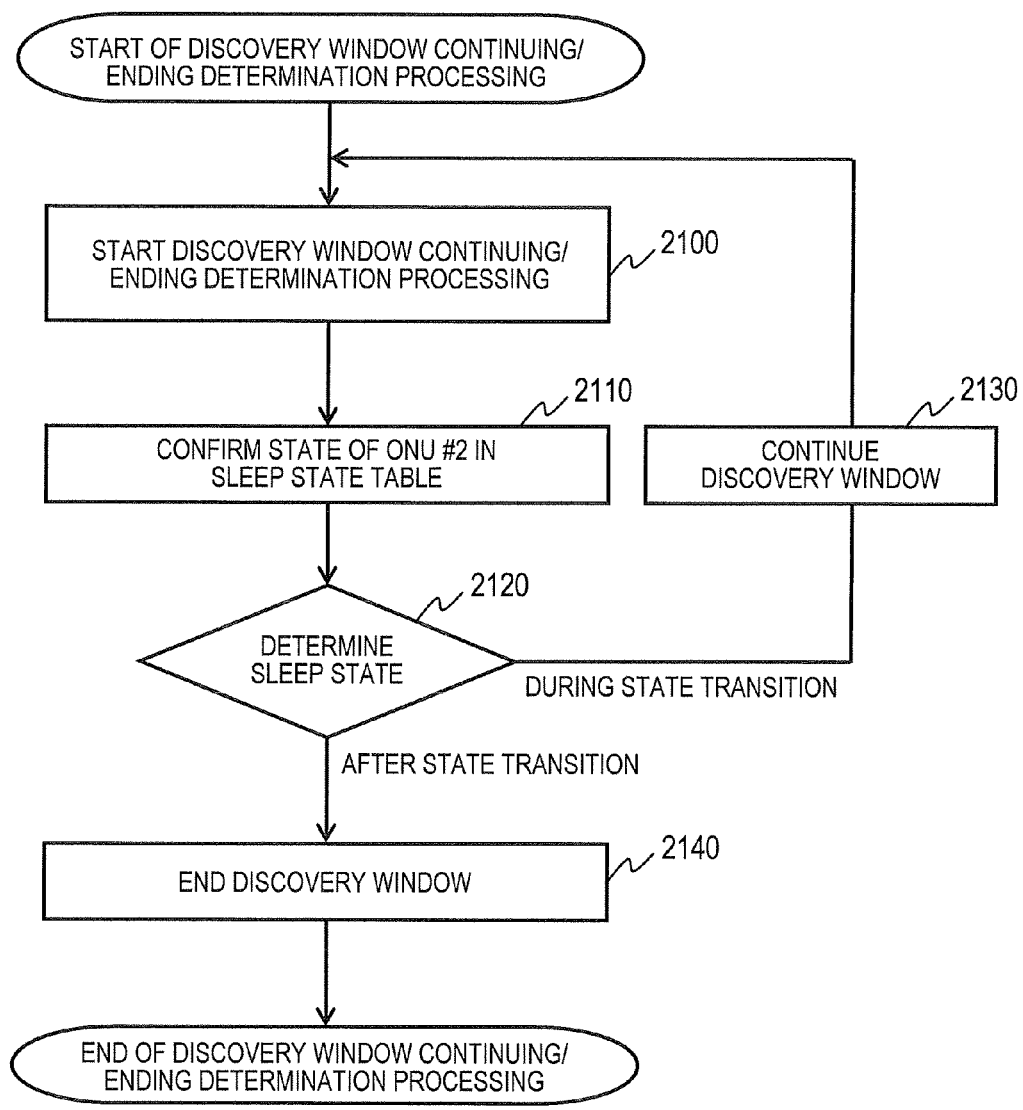
FIG. 13 is a flowchart illustrating processing by the DBA control unit in a discovery window according to the second embodiment of this invention.

FIG. 13 is a flowchart illustrating processing by the DBA control unit 280 in the discovery window according to the second embodiment of this invention.

The processing illustrated in FIG. 13 is processing of controlling the discovery window by the DBA control unit 280 of the OLT 100 while the state of the ONU 110-2 is transitioning.

After the discovery window starts, the DBA control unit 280 of the OLT 100 starts processing of determining whether to end or to continue the discovery window (Step 2100). The DBA control unit 280 holds in advance the time point at which the discovery window ends, and may carry out Step 2100 a predetermined period specified in advance by the administrator or the like before the time point at which the discovery window ends.

After Step 2100, the DBA control unit 280 refers to the sleep state transition flag 250-3 in the sleep state management table 250 (Step 2110). Then, the DBA control unit 280 determines whether or not the value of the sleep state transition flag 250-3 contains "on" (Step 2120).

When the value of the sleep state transition flag 250-3 contains "on", at least one ONU 110 is transitioning between states, and the DBA control unit 280 determines to continue the discovery window (Step 2130). Then, the DBA control unit 280 continues the discovery window for a period determined in advance by the administrator or the like. Specifically, the DBA control unit 280 adds the period determined in advance by the administrator or the like to the held time point at which the discovery window ends, and newly holds a result of addition as a time point at which the discovery window ends.

When the value of the sleep state transition flag 250-3 does not contain "on", the DBA control unit 280 ends the discovery window at the held time point at which the discovery window ends in order to allocate a bandwidth used for an upstream frame to the ONUs 110 other than the ONU 110-2 (Step 2140).

Upstream frames are not transmitted from the ONUs 110 other than the ONU 110-2 while the ONU 110-2 is transitioning between the states by the processing of FIGS. 12 and 13. Therefore, it is possible to prevent a packet loss due to the erroneous light emission generated while the state of the ONU 110-2 is transitioning between states.

Figure 14:
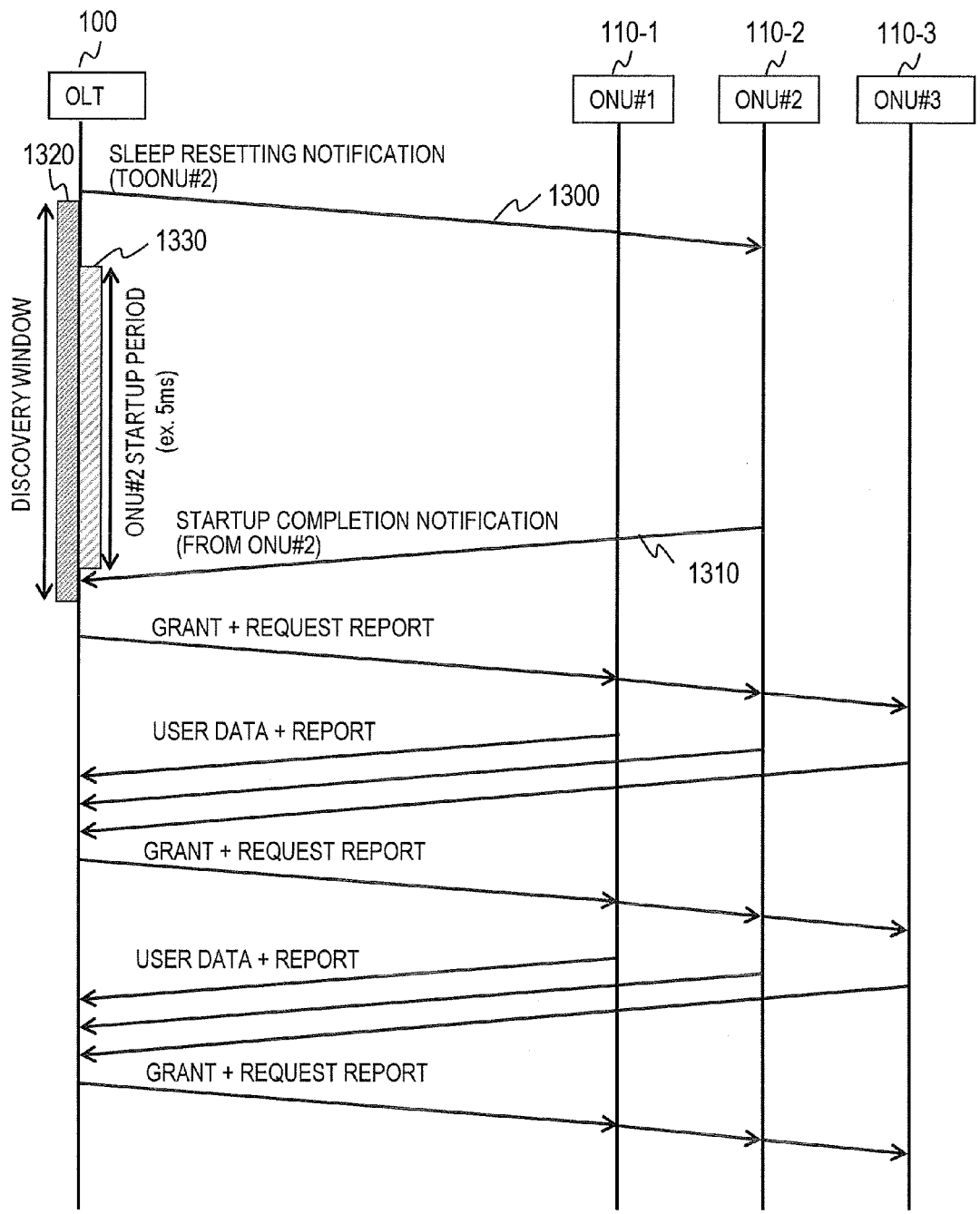
FIG. 14 is a sequence diagram illustrating processing in which the discovery window is controlled when the ONU transitions to the active state according to the second embodiment of this invention.

FIG. 14 is a sequence diagram illustrating processing in which the discovery window is controlled when the ONU 110-2 transitions to the active state according to the second embodiment of this invention.

FIG. 14 is a sequence diagram of the OLT 100 and each of the ONUs 110 when the processing of FIGS. 12 and 13 is carried out. FIG. 14 illustrates processing in which the ONU 110-2 transitions to the active state while the OLT 100 is carrying out the discovery.

When the OLT 100 determines to control the state of the ONU 110-2 to transition to the active state as illustrated in Step 1200 of FIG. 12, the OLT 100 transmits a sleep resetting notification 1300 directed to the ONU 110-2 to each of the ONUs 110 before a time point at which the ONU 110-2 starts the processing of transitioning between the states. When the ONU 110-2 receives the sleep resetting notification 1300, the ONU 110-2 starts the processing of transitioning from the sleep state to the active state at the time point which is represented by the sleep resetting notification 1300, and at which the processing of transitioning between the states starts.

The state of the ONU 110-2 is unstable during a period 1330 (such as 5 milliseconds) in which the ONU 110-2 transitions to the active state. However, even when an unintended erroneous light emission is generated from the ONU 110-2 in the period 1330, the OLT 100 is carrying out the discovery in a discovery window 1320, and does not allocate a bandwidth used for an upstream frame to the ONUs 110.

Therefore, the OLT 100 according to the second embodiment can maximally reduce the interference of the erroneous light emission generated by the ONU 110-2 with an upstream frame. The OLT 100 continues the discovery window 1320 until a startup completion notification 1310 is transmitted by the ONU 110-2.

After all functions transition to the active state in the ONU 110-2, the ONU 110-2 transmits the startup completion notification 1310 to the OLT 100. The OLT 100 receives the startup completion notification 1310 transmitted from the ONU 110-2, thereby confirming the transition to the active state of the ONU 110-2. Then, the OLT 100 carries out the normal DBA processing, and allocates a bandwidth used to transmit an upstream frame depending on the necessity of each of the ONUs 110.

Figure 15:
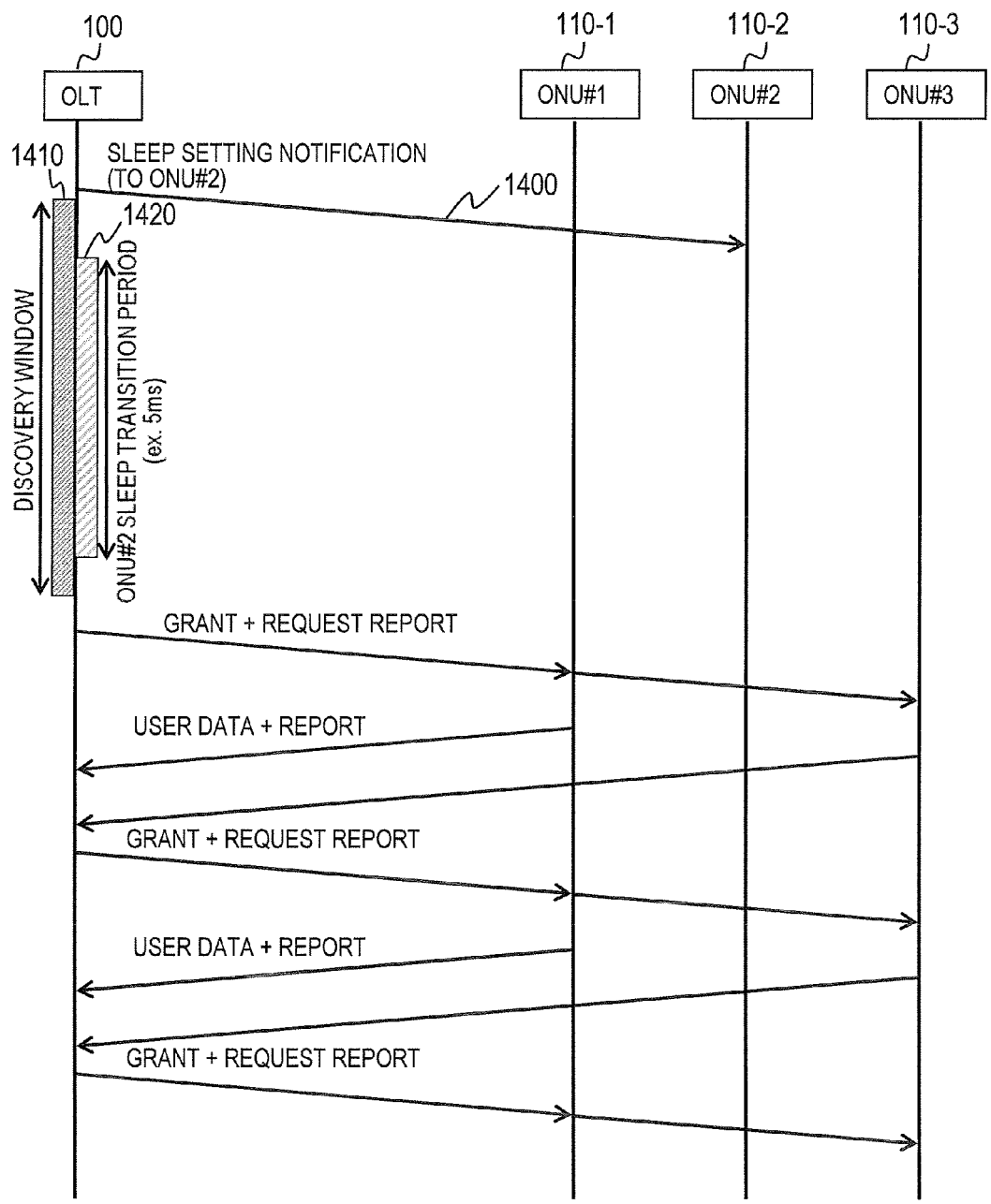
FIG. 15 is a sequence diagram illustrating processing in which the discovery window is controlled when the ONU transitions to the sleep state according to the second embodiment of this invention.

FIG. 15 is a sequence diagram illustrating processing in which the discovery window is controlled when the ONU 110-2 transitions to the sleep state according to the second embodiment of this invention.

FIG. 15 is a sequence diagram of the OLT 100 and each of the ONUs 110 when the processing of FIGS. 12 and 13 is carried out. FIG. 15 illustrates processing in which the ONU 110-2 transitions to the sleep state while the OLT 100 is carrying out the discovery in the discovery window.

When the OLT 100 determines to control the state of the ONU 110-2 to transition to the sleep state as illustrated in Step 900 of FIG. 8, the OLT 100 transmits a sleep setting notification 1400 directed to the ONU 110-2 before a time point at which the ONU 110-2 starts the processing of transitioning between the states. When the ONU 110-2 receives the sleep setting notification 1400, the ONU 110-2 starts the processing of transitioning from the active state to the sleep state at the time point contained in the sleep setting notification 1400.

The state of the ONU 110-2 is unstable during a period 1420 (such as 5 milliseconds) in which the ONU 110-2 transitions to the sleep state. However, even when an unintended erroneous light emission is generated from the ONU 110-2 in the period 1420, the OLT 100 is carrying out the discovery in the discovery window 1410, and does not allocate a bandwidth used for an upstream frame to the ONUs 110.

Therefore, the OLT 100 according to the second embodiment can maximally reduce the interference of the erroneous light emission generated from the ONU 110-2 with an upstream frame. The OLT 100 continues the discovery in the discovery window 1410 until the OLT 100 detects the disconnection of the communication to/from the ONU 110-2.

Then, the OLT 100 carries out the normal DBA processing after the OLT 100 detects the disconnection of the communication to/from the ONU 110-2, and allocates a bandwidth used to transmit an upstream frame depending on the necessity of each of the ONUs 110.

According to the second embodiment, it is possible to prevent a packet loss of an upstream frame from other ONUs due to an unintended erroneous light emission generated from the ONU 110-2 when the ONU 110-2 transitions to the sleep state or the active state by the control of the OLT 100 which controls the ONU 110 to transition between states in the discovery window.

(Third Embodiment)

According to a third embodiment of this invention, the OLT 100 allocates a bandwidth to an ONU 110 higher in optical intensity than the ONU 110-2, and does not allocate a bandwidth to an ONU 110 lower in optical intensity than the ONU 110-2 during a period (such as several milliseconds) in which the ONU 110-2 is transitioning between states. As a result, it is possible to prevent a packet loss of an upstream frame transmitted from other ONUs 110 due to an unintended erroneous light emission generated by the ONU 110-2 while the ONU 110-2 is transitioning between the states. Further, a bandwidth used to transmit the upstream frame is allocated to the ONU 110 higher in optical intensity than the ONU 110-2, which results in an increase in availability.

Figure 16:
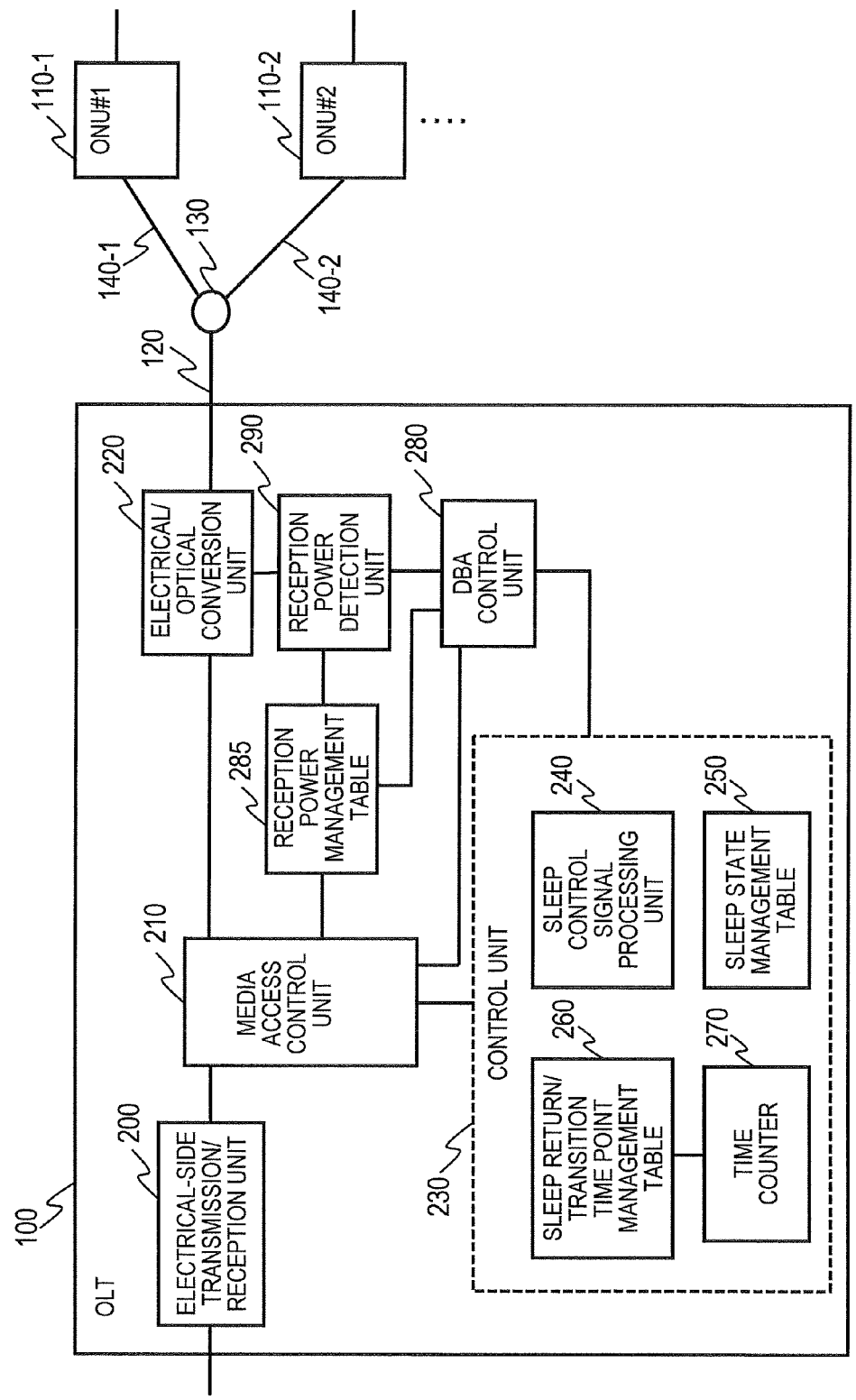
FIG. 16 is a block diagram illustrating the physical configuration of the OLT according to a third embodiment of this invention.

FIG. 16 is a block diagram illustrating a physical configuration of the OLT 100 according to the third embodiment of this invention.

The OLT 100 according to the third embodiment includes the electrical-side transmission/reception unit 200, the media access control unit 210, the electrical/optical conversion unit 220, the control unit 230, and the DBA control unit 280, and the reception power detection unit 290 as in the first embodiment. The electrical-side transmission/reception unit 200, the media access control unit 210, the electrical/optical conversion unit 220, the control unit 230, and the DBA control unit 280, and the reception power detection unit 290 of the OLT 100 according to the third embodiment have the same functions as those of the respective processing units of the first embodiment.

The OLT 100 according to the third embodiment includes a reception power management table 285, which is different from the first embodiment. The reception power management table 285 is coupled to the media access control unit 210, the DBA control unit 280, and the reception power detection unit 290.

The reception power management table 285 is a table for holding an optical intensity of each of the ONUs 110 detected by the reception power detection unit 290. The reception power detection unit 290 detects the optical intensity of each of the ONUs 110 periodically or in accordance with an instruction by the administrator or the like, and stores a detection result in the reception power management table 285.

The optical intensity detected by the OLT 100 depends on the distance from the OLT 100 to the ONU 110, and also generally depends on the number of optical splitters 130 which is in the course from the OLT 100 to each of the ONUs 110.

Figure 17:
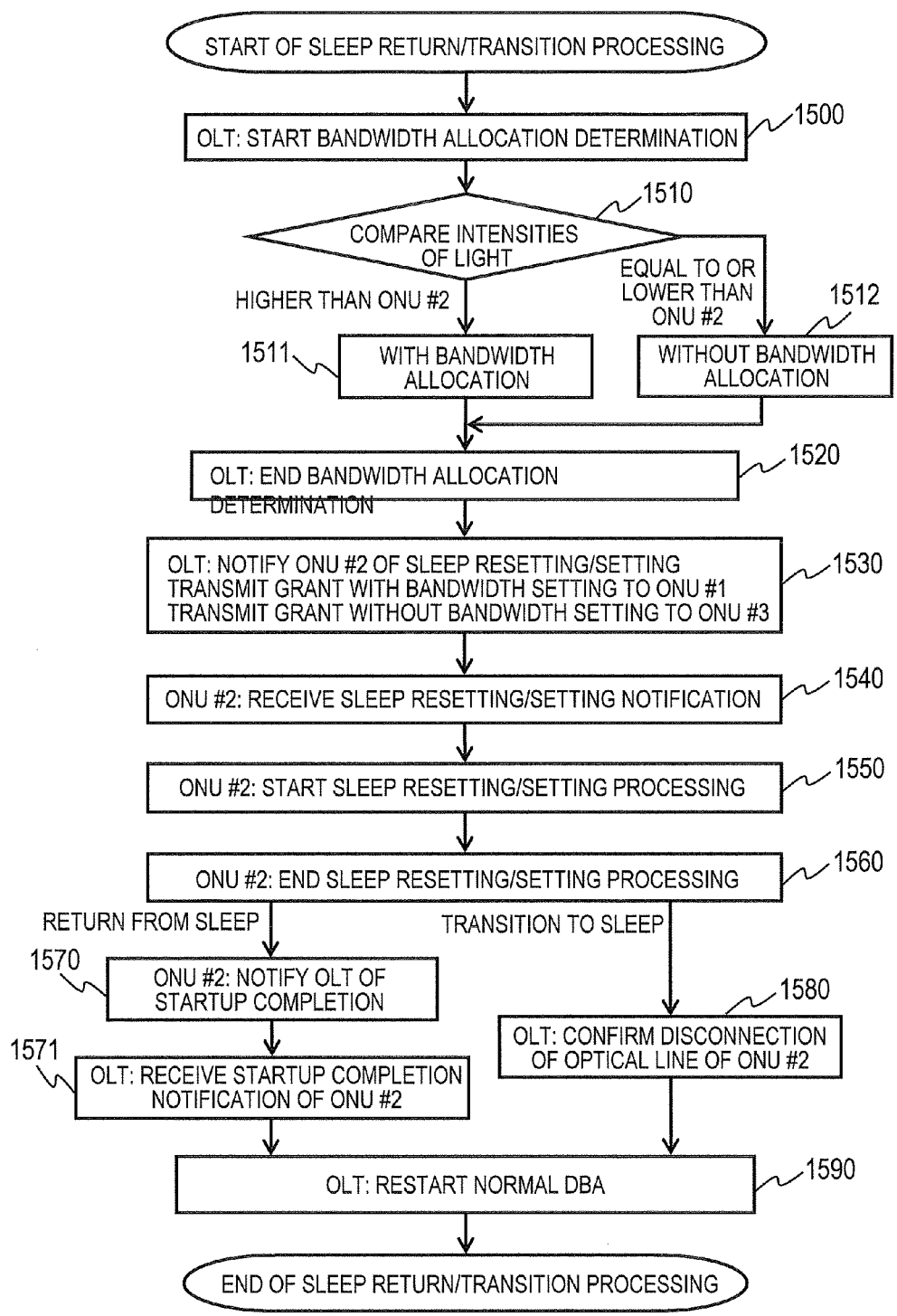
FIG. 17 is a flowchart illustrating processing in which the state of the ONU is controlled to transition according to the third embodiment of this invention.

FIG. 17 is a flowchart illustrating processing in which the state of the ONU 110-2 transitions according to the third embodiment of this invention;

The media access control unit 210 determines to control the ONU 110-2 to transition to the sleep state when the media access control unit 210 does not receive a downstream frame to the ONU 110-2 or an upstream frame from the ONU 110-2 for a predetermined period. Moreover, when the media access control unit 210 receives downstream frames directed to the ONU 110-2 in a predetermined traffic volume, and the sleep state management table 250 represents that the ONU 110-2 is in the sleep state (the state 250-2 of the sleep state management table 250 is "sleep"), the media access control unit 210 determines to control the ONU 110-2 to transition to the active state.

When it is determined to control the state of the ONU 110-2 to transition, the media access control unit 210 starts processing of determining ONUs 110 to which a bandwidth is to be allocated (Step 1500).

The media access control unit 210 refers to the reception power management table 285, compares the ONU 110-2 and the other ONUs 110 in optical intensity with each other, and determines whether the optical intensity of each of the ONUs 110 contained in the reception power management table 285 is higher than the optical intensity of the ONU 110-2 or equal to or less than the optical intensity of the ONU 110-2 (Step 1510).

Then, a bandwidth is allocated to an ONU 110 determined to be higher in optical intensity than the ONU 110-2, and it is thus determined that the ONU 110 is with bandwidth allocation (Step 1511). This is because an upstream frame transmitted from the ONU 110 determined to be higher in optical intensity than the ONU 110-2 is not possibly interfered with by an erroneous light emission generated by the ONU 110-2.

Moreover, it is determined that an ONU 110 determined to be, in optical intensity, equal to or less than the ONU 110-2 is without bandwidth allocation (Step 1512). This is because an upstream frame transmitted from the ONU 110 determined to be equal to or less in optical intensity than the ONU 110-2 is possibly interfered with by an erroneous light emission generated by the ONU 110-2.

In Steps 1511 and 1512, the media access control unit 210 stores information on whether each of the ONUs 110 is with or without bandwidth allocation in the reception power management table 285.

After the media access control unit 210 compares the optical intensity of all the ONUs 110 contained in the reception power management table 285 and the optical intensity of the ONU 110-2, the media access control unit 210 ends the processing of determining ONUs 110 to which a bandwidth is to be allocated (Step 1520).

After Step 1520, the media access control unit 210 determines a time point at which the ONU 110-2 starts the processing of transitioning between the states, and stores the determined time point in the sleep control signal processing unit 240. As described above, based on the result of the determination as to whether the ONU 110-2 is controlled to transition to the sleep state or the active state, the media access control unit 210 instructs the sleep control signal processing unit 240 to control the ONU 110-2 to transition to the sleep state or the active state.

When the sleep control signal processing unit 240 is instructed to control the ONU 110-2 to transition to the sleep state or the active state by the media access control unit 210, the sleep control signal processing unit 240 generates the sleep control signal in accordance with the instruction from the media access control unit 210. In other words, the sleep control signal processing unit 240 generates the sleep resetting notification representing the instruction to control the ONU 110-2 to transition to the active state, or the sleep setting notification representing the instruction to control the ONU 110-2 to transition to the sleep state.

The sleep control signal processing unit 240 adds, to the sleep resetting notification or the sleep setting notification, the time point which is stored in the sleep return/transition time point management table 260, and at which the ONU 110-2 starts the processing of transitioning between the states. Moreover, the sleep control signal processing unit 240 adds, to the sleep resetting notification or the sleep setting notification, a value representing that the state of the ONU 110-2 transitions.

Then, the sleep control signal processing unit 240 transmits the generated sleep resetting notification or sleep setting notification, namely the sleep control signal, to the DBA control unit 280. Further, the sleep control signal processing unit 240 changes the value of the sleep state transition flag 250-3 corresponding to the ONU 110-2 in the sleep state management table 250 to "on". As a result, the OLT 100 can recognize that the state of the ONU 110-2 is transitioning.

When the sleep control signal is transmitted to the DBA control unit 280 from the sleep control signal processing unit 240, the DBA control unit 280 generates a grant signal for allocating a bandwidth used to transmit an upstream frame to each of the ONUs 110, in accordance with the content of the sleep control signal and the reception power management table 285.

Specifically, the DBA control unit 280 generates a grant signal for not allocating a bandwidth used to transmit an upstream frame to an ONU 110 without bandwidth allocation represented by the reception power management table 285, and for allocating a bandwidth used to transmit an upstream frame to an ONU 110 with bandwidth allocation represented by the reception power management table 285. The generated grant signal contains the sleep control signal. Then, the DBA control unit 280 transmits the generated grant signal to each of the ONUs 110 via the electrical/optical conversion unit 220 (Step 1530).

Processing in Steps 1540 to 1590 is the same as that in Steps 910 to 960 of FIG. 8. However, during Steps 1530 to 1590, the DBA control unit 280 transmits, to each of the ONUs 110, the grant signal representing that a bandwidth used to transmit an upstream frame is not allocated to an ONU 110 without bandwidth allocation, and a bandwidth used to transmit an upstream frame is allocated to an ONU 110 with bandwidth allocation.

In the third embodiment, an ONU 110 weak in optical intensity is less advantageous in the bandwidth allocation, namely less in frequency of the allocation of a bandwidth, than an ONU 110 high in optical intensity, and hence the OLT 100 may supplement a bandwidth for the ONU 110 weak in optical intensity after the processing of controlling the ONU 110-2 to transition between the states. As a result, it is possible to reduce the disadvantage in the bandwidth allocation due to the distance from the OLT 100 or the like.

Figure 18:
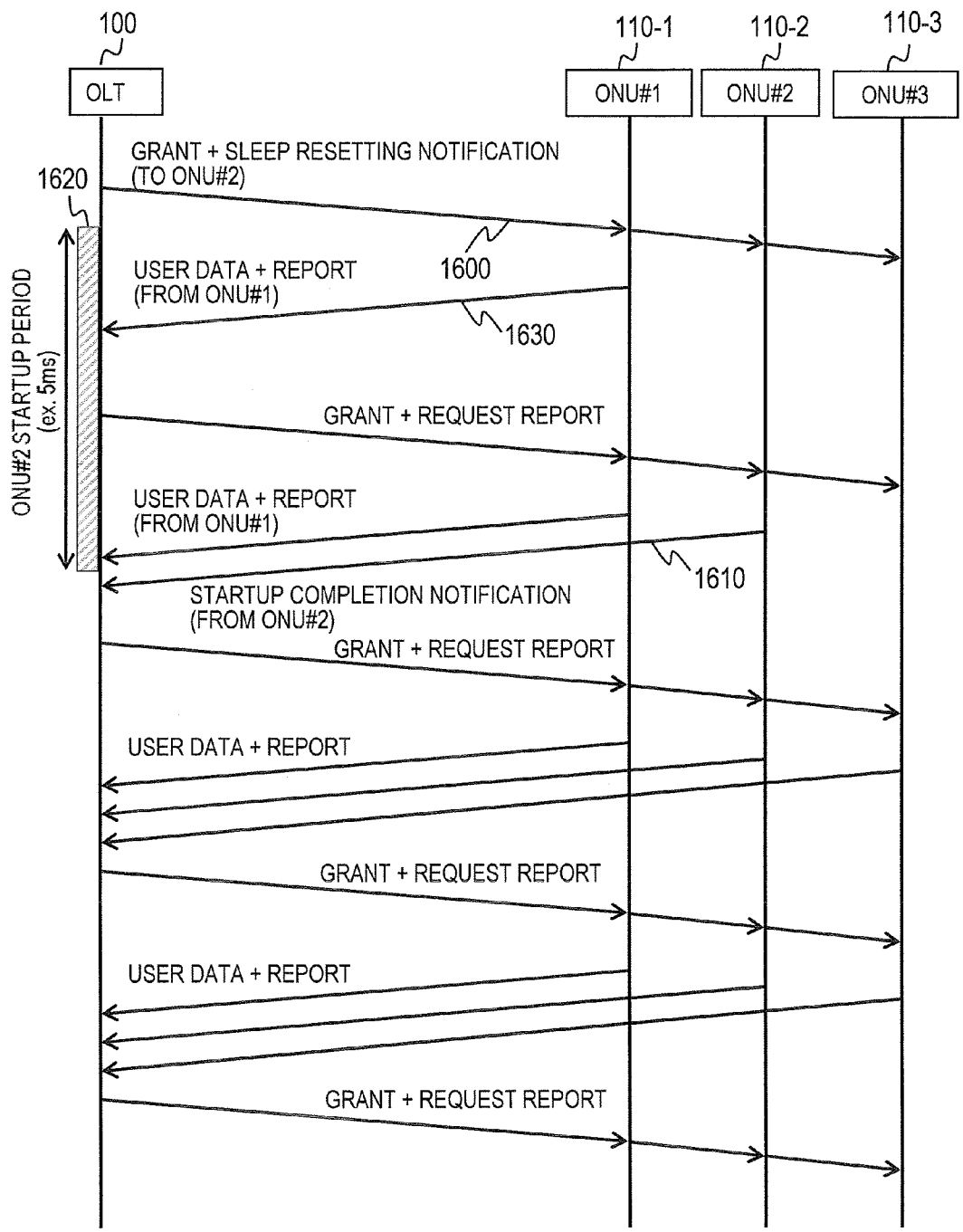
FIG. 18 is a sequence diagram illustrating processing in which upstream frames transmitted from ONUs are controlled when the ONU transitions to the active state according to the third embodiment of this invention.

FIG. 18 is a sequence diagram illustrating processing in which upstream frames transmitted from ONUs 110 are controlled when the ONU 110-2 transitions to the active state according to the third embodiment of this invention.

FIG. 18 is a sequence diagram of the OLT 100 and each of the ONUs 110 when the processing of FIG. 17. In the sequence diagram illustrated in FIG. 18, the distance between the ONU 110-1 and the OLT 100 is shorter than the distance between the ONU 110-2 and the OLT 100. In other words, the optical intensity of the signal transmitted by the ONU 110-1 is higher than the optical intensity of the signal transmitted by the ONU 110-2. Moreover, the distance between the ONU 110-3 and the OLT 100 is longer than the distance between the ONU 110-2 and the OLT 100. In other words, the optical intensity of the signal transmitted by the ONU 110-3 is lower than the optical intensity of the signal transmitted by the ONU 110-2.

When the OLT 100 determines to control the state of the ONU 110-2 to transition to the active state, the OLT 100 transmits a grant signal 1600 containing the sleep resetting notification directed to the ONU 110-2 to each of the ONUs 110. The grant signal 1600 represents the fact that a bandwidth used to transmit the upstream frame is to be allocated to the ONUs 110 determined to be with bandwidth allocation out of the ONUs 110 other than the ONU 110-2. In FIG. 18, the ONU 110 determined to be with bandwidth allocation is the ONU 110-1.

When the ONU 110-2 receives the grant signal 1600, the ONU 110-2 starts the processing of transitioning from the sleep state to the active state. A bandwidth is not allocated through the grant signal 1600 to the ONUs 110 lower in optical intensity than the ONU 110-2 during a period 1620 (such as 5 milliseconds) in which the ONU 110-2 transitions to the active state. Therefore, even when the state of the ONU 110-2 becomes unstable, and an unintended erroneous light emission is generated from the ONU 110-2 in the period 1620, it is possible to prevent the erroneous light emission from interfering with an upstream frame transmitted from the ONU 110 (ONU 110-3) lower in optical intensity than the ONU 110-2.

When the ONU 110-1 receives the grant signal 1600, the ONU 110-1 transmits an upstream frame 1630 in accordance with the bandwidth represented by the grant signal 1600, and is allocated to the ONU 110-1.

Moreover, until the OLT 100 receives the startup completion notification 1610 from the ONU 110-2, the OLT 100 transmits, to each of the ONUs 110, the grant signal for not allocating a bandwidth used to transmit an upstream frame to the ONU 110 lower in optical intensity than the ONU 110-2, and for allocating a bandwidth for transmitting an upstream frame to the ONU 110 higher in optical intensity than the ONU 110-2.

After all functions transition to the active state in the ONU 110-2, the ONU 110-2 transmits the startup completion notification 1610 to the OLT 100. The OLT 100 receives the startup completion notification 1610 transmitted from the ONU 110-2, thereby determining that the state of the ONU 110-2 has transitioned to the active state. Then, the OLT 100 carries out the normal DBA processing. In other words, after the OLT 110 receives the startup completion notification 1610, the OLT 110 allocates a bandwidth used to transmit an upstream frame to each of the ONUs 110 depending on the necessity of each of the ONUs 110.

Figure 19:
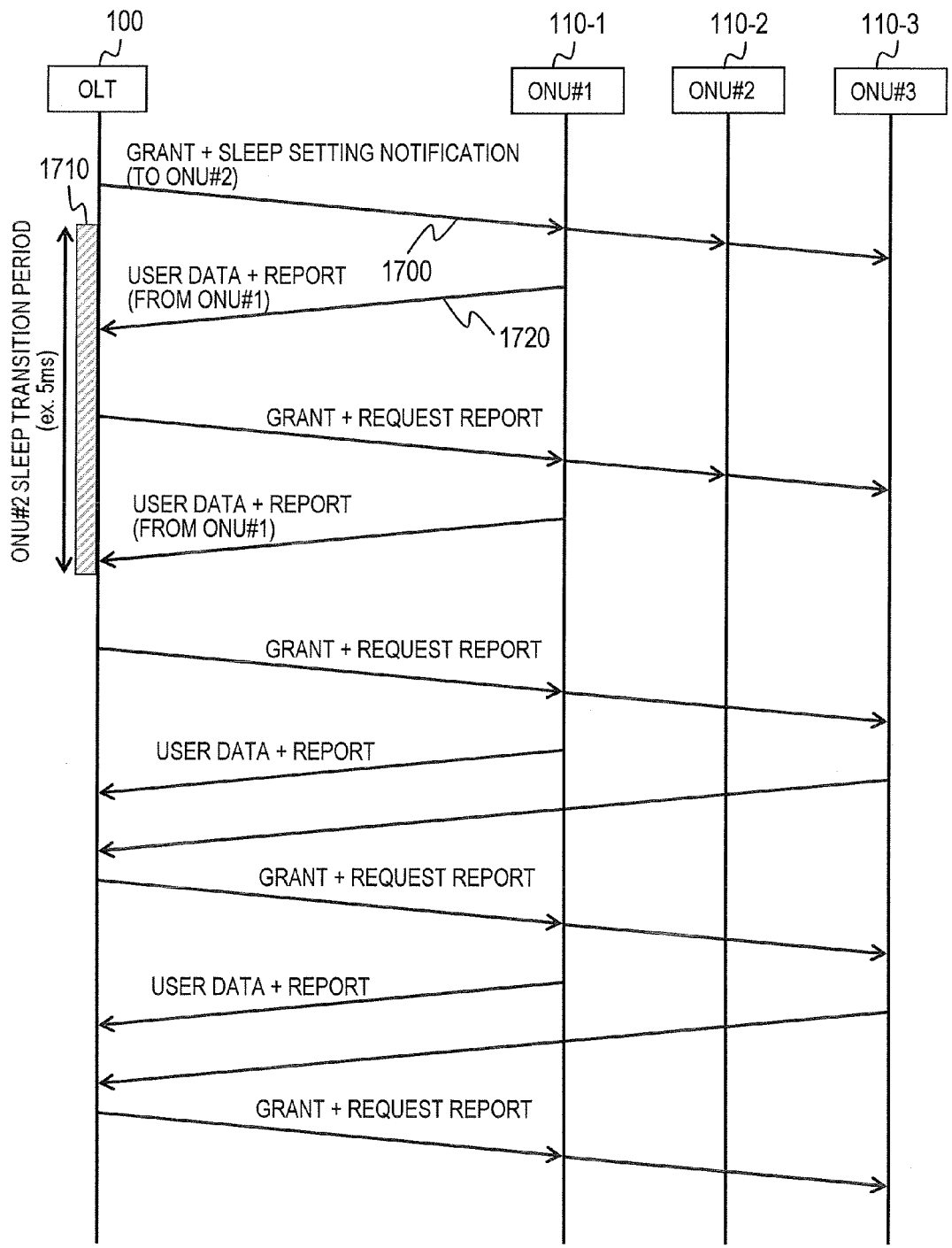
FIG. 19 is a sequence diagram illustrating processing in which upstream frames transmitted from ONUs are controlled when the ONU transitions to the sleep state according to the third embodiment of this invention.

FIG. 19 is a sequence diagram illustrating processing in which upstream frames transmitted from ONUs 110 are controlled when the ONU 110-2 transitions to the sleep state according to the third embodiment of this invention.

In the sequence diagram illustrated in FIG. 19, similarly to FIG. 18, the optical intensity of the signal transmitted by the ONU 110-1 is higher than the optical intensity of the signal transmitted by the ONU 110-2, and the optical intensity of the signal transmitted by the ONU 110-3 is lower than the optical intensity of the signal transmitted by the ONU 110-2.

When the OLT 100 determines to control the state of the ONU 110-2 to transition to the sleep state, the OLT 100 transmits a grant signal 1700 containing the sleep setting notification to each of the ONUs 110. The grant signal 1700 represents that a bandwidth is not allocated to the ONUs 110 lower in optical intensity than the ONU 110-2.

When the ONU 110-2 receives the grant signal 1700, the ONU 110-2 starts the processing of transitioning from the active state to the sleep state. Bandwidths are not allocated through the grant signal 1700 to the ONUs 110 lower in optical intensity than the ONU 110-2 during a period 1710 (such as 5 milliseconds) in which the ONU 110-2 transitions to the sleep state. Therefore, even when the state of the ONU 110-2 becomes unstable, and an unintended erroneous light emission is generated from the ONU 110-2 in the period 1710, it is possible to prevent the erroneous light emission from interfering with an upstream frame transmitted from the ONU 110 (ONU 110-3) lower in optical intensity than the ONU 110-2.

Moreover, until the OLT 100 determines that the communication to/from the ONU 110-2 is disconnected, the OLT 100 transmits, to each of the ONUs 110, the grant signal for not allocating a bandwidth used to transmit an upstream frame to the ONU 110 lower in optical intensity than the ONU 110-2, and for allocating a bandwidth for transmitting an upstream frame to the ONU 110 higher in optical intensity than the ONU 110-2.

When the OLT 100 detects that the communication to/from the ONU 110-2 is disconnected, the OLT 100 determines that the ONU 110-2 has transitioned to the sleep state. Then, the OLT 100 restarts the normal DBA processing. In other words, after the OLT 110 determines that the ONU 110-2 has transitioned to the sleep state, the OLT 110 allocates a bandwidth used to transmit an upstream frame depending on the necessity of each of the ONUs 110.

According to the third embodiment, through the bandwidth control for transmitting the upstream frame by the OLT 100, a bandwidth used to transmit an upstream frame is not allocated to an ONU 110 lower in optical intensity than the ONU 110 transitioning between the states. Therefore, a packet loss of an upstream frame from other ONUs 110 can be prevented even when an unintended erroneous light emission is generated from the ONU 110 which is transitioning to the sleep state or the active state.

Further, according to the third embodiment, a bandwidth used for an upstream frame is allocated to an ONU 110 which cannot be interfered with by the erroneous light emission generated from the ONU 110 transitioning between states, and the number of the ONUs 110 to which a bandwidth is allocated can thus be increased, and the availability of the system can be increased.

The OLT 100 according to this embodiment can prevent an unintended erroneous light emission generated by the ONU 110 transitioning to the sleep state or the active state from causing a packet loss of an upstream frame from other ONUs 110.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical line terminal to be coupled to a plurality of optical network units via optical communication, comprising:
   at least one processor; and
   at least one non-transient storage medium connected to the processor which stores information of time points at which the optical network units respectively start to enter a first transient period from a powered-on state to a powered-off state or a second transient period from the powered-off state to the powered-on state during which said optical network unit can emit an unintended light signal, and the at least one non-transient storage medium storing instructions which cause the processor to execute:

a determination part configured to determine a first time point at which a first optical network unit of the optical network units starts to enter one of the first transient period or the second transient period;

a transmission part configured to transmit a state control signal containing the first time point to the first optical network unit in order to control the first optical network unit to start to enter the one of the first transient period or the second transient period; and an allocation part configured to stop allocating a bandwidth, used to transmit a signal to the optical line terminal, to a second optical network unit of the optical network units other than the first optical network unit during the one of the first transient period or the second transient period during which the first optical network unit can emit the unintended light signal.

2. The optical line terminal according to claim 1, wherein the at least one non-transient storage medium further stores a transient period management table containing values representing whether or not each of the optical network units are in the first transient period or the second transient period, wherein a respective value representing that the first optical network unit is in the first transient period or in the second transient is stored in the transient period management table corresponding to the first time point, wherein the respective value representing that the first optical network unit is in the first transient period or the second transient period is changed in a case where it is determined that the first optical network unit has left the first transient period or the second transient period after transmitting the state control signal to the first optical network unit in order to control the first optical network unit to start to enter the one of the first transient period or the second transient period during which the first optical network unit can potentially emit the unintended light signal, and wherein the allocation part stops allocating the bandwidth used to transmit the signal to the optical line terminal to the second optical network unit in a case where the respective value represents that the first optical network unit is in the first transient period or the second transient period during which the first optical network unit can potentially emit the unintended light signal.

3. The optical line terminal according to claim 2, wherein the allocation part determines that the first optical network unit has left the second transient period in a case where the optical line terminal receives a notification from the first optical network unit indicating that the first optical network unit has left the second transient period after transmitting the state control signal including a second notification to the first optical network unit in order to control the first optical network unit to start to enter the second transient period during which the first optical network unit can potentially emit the unintended light signal, and wherein the allocation part determines that the first optical network unit has left the first transient period in a case where the optical line terminal detects that the optical line terminal cannot communicate with the first optical network unit after transmitting the state control signal including a first notification to the first optical network unit in order to control the first optical network unit to start to enter the first transient period from powered-on to powered-off during which the first optical network unit can potentially emit the unintended light signal.

4. The optical line terminal according to claim 3 further comprising:

a measurement part configured to measure optical intensities of signals transmitted from the plurality of optical network units; and an identification part configured to identify one of the plurality of optical network units that transmits a signal at an optical intensity lower than an optical intensity of a signal transmitted from the first optical network unit as the second optical network unit.

5. The optical line terminal according to claim 1, wherein the at least one non-transient storage medium further stores information of a period during which discovery is carried out, and wherein the determination part determines the first time point so that the first time point is contained in the period during which the discovery is carried out.

6. The optical line terminal according to claim 5, wherein the allocation part stops allocating the bandwidth used to transmit the signal to the optical line terminal to the second optical network unit by continuing the period during which the discovery is carried out from the first time point until it is determined that the first optical network unit has left the first transient period or the second transient period.

7. A bandwidth control method employed in an optical line terminal coupled to a plurality of optical network units via optical communication, the bandwidth control method comprising:

determining, by the optical line terminal, a first time point at which a first optical network unit of the optical network units starts to enter a first transient period from a powered-on state to a powered-off state or a second transient period from the powered-off state to the powered-on state during which said optical network unit can emit an unintended light signal;

transmitting, by the optical line terminal, a state control signal containing the first time point to the first optical network unit in order to control the first optical network unit to start to enter the first transient period or the second transient period; and stopping, by the optical line terminal, allocating a bandwidth, used to transmit a signal to the optical line terminal, to a second optical network unit of the optical network units other than the first optical network unit during the one of the first transient period or the second transient period during which the first optical network unit can emit the unintended light signal.

8. The bandwidth control method according to claim 7, wherein the optical line terminal stores a a transient period management table containing values representing whether or not each of the optical network units are in the first transient period or the second transient period, and wherein the bandwidth control method further comprising:

storing, by the optical line terminal, a respective value representing that the first optical network unit is in the first transient period or in the second transient in the transient period management table corresponding to the first time point; and changing, by the optical line terminal, the respective value representing that the first optical network unit is in the first transient period or the second transient period in a case where the optical line terminal determines that the first optical network unit has left the first transient period or the second transient period after transmitting the state control signal to the first optical network unit to enter the one of the first transient period or the second transient period during which the first optical network unit can potentially emit the unintended light signal,
wherein the allocating of the bandwidth used to transmit the signal to the optical line terminal to the second optical network unit is stopped in a case where the respective value represents that the first optical network unit is in the first transient period or the second transient period during which the first optical network unit can potentially emit the unintended light signal.

9. The bandwidth control method according to claim 8, further comprising:
determining, by the optical line terminal, that the first optical network unit has left the second transient period in a case where the optical line terminal receives a notification indicating that the first optical network unit has left the second transient period after transmitting the state control signal including a second notification to the first optical network unit in order to control the first optical network unit to start to enter the second transient period during which the first optical network unit can potentially emit the unintended light signal; and
determining, by the optical line terminal, that the first optical network unit has left the first transient period in a case where the optical line terminal detects that the optical line terminal cannot communicate with the first optical network unit after transmitting the state control signal including a first notification to the first optical network unit in order to control the first optical network unit to enter the first transient period from powered-on to powered-off during which the first optical network unit can potentially emit the unintended light signal.

10. The bandwidth control method according to claim 9, further comprising:
measuring, by the optical line terminal, an optical intensity of a signal transmitted from the plurality of optical network units; and
identifying, by the optical line terminal, one of the plurality of optical network units that transmits the signal at an optical intensity lower than an optical intensity of the signal transmitted from the first optical network unit as the second optical network unit.

11. The bandwidth control method according to claim 7, wherein the optical line terminal stores information of a period during which discovery is carried out; and
the bandwidth control method further comprising:
determining, by the optical line terminal, the first time point so that the first time point is contained in the period during which the discovery is carried out.

12. The bandwidth control method according to claim 11, further comprising:
stopping, by the optical line terminal, allocating the bandwidth used to transmit the signal to the optical line terminal to the second optical network unit by continuing the period during which the discovery is carried out from the first time point until it is determined that the first optical network unit has left the first transient period or the second transient period.

13. An optical network system, comprising:
a plurality of optical network units; and
an optical line terminal coupled to each of the plurality of optical network units via optical communication, the optical line terminal having at least one processor and at least one non-transient storage medium connected to the processor which stores information of time points at which the optical network units respectively start to enter a first transient period from a powered-on state to a powered-off state or a second transient period from the powered-off state to the powered-on state during which said optical network unit can emit an unintended light signal,
and the at least one non-transient storage medium storing instructions which cause the processor to:
determine a first time point at which a first optical network unit of the optical network units starts to enter one of the first transient period or the second transient period;
transmit a state control signal containing the first time point to the first optical network unit in order to control the first optical network unit to start to enter the one of the first transient period or the second transient period; and
stop allocating a bandwidth, used to transmit a signal to the optical line terminal, to a second optical network unit of the plurality of optical network units other than the first optical network unit during the one of the first transient period or the second transient period during which the first optical network unit can emit the unintended light signal.

* * * * *